US012608473B2

(12) United States Patent
Taylor

(10) Patent No.: US 12,608,473 B2
(45) Date of Patent: Apr. 21, 2026

(54) SYSTEMS AND METHODS FOR DETERMINING AND DETECTING MALWARE FAMILIES

(71) Applicant: Target Brands, Inc., Minneapolis, MN (US)

(72) Inventor: Nicholas Taylor, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 393 days.

(21) Appl. No.: 18/110,504

(22) Filed: Feb. 16, 2023

(65) Prior Publication Data

US 2024/0281531 A1 Aug. 22, 2024

(51) Int. Cl.
*H04L 29/06* (2006.01)
*G06F 21/56* (2013.01)

(52) U.S. Cl.
CPC ...... *G06F 21/566* (2013.01); *G06F 2221/033* (2013.01)

(58) Field of Classification Search
CPC ............. G06F 21/566; G06F 2221/033; G06F 21/564; G06F 21/56; G06F 18/24765; H04L 63/145; H04L 63/0263; H04L 63/1425; H04L 2463/144; H04L 63/1416; G05B 23/0227; G05B 23/0245; G05B 2219/32186; H04M 15/47; H04M 2215/0148; H04M 7/0078; H04N 1/00729; H04N 1/00742; H04N 1/00763; H04W 12/12; H04W 12/121; H05K 1/0275; G16Y 40/10
See application file for complete search history.

(56) References Cited

U.S. PATENT DOCUMENTS

| | | | |
|---|---|---|---|
| 7,519,998 B2 | 4/2009 | Cai et al. | |
| 7,966,658 B2 | 6/2011 | Singh et al. | |
| 8,065,729 B2 | 11/2011 | Yi et al. | |

(Continued)

OTHER PUBLICATIONS

Bilstein & Plohmann, "YARA-signator: Automated generation of code-based YARA rules," J. Cybercrime Digit, 2019, 5(1):1-3.

(Continued)

*Primary Examiner* — Amir Mehrmanesh
*Assistant Examiner* — Leynna Truvan
(74) *Attorney, Agent, or Firm* — Barnes & Thornburg LLP

(57) ABSTRACT

Disclosed are techniques for identifying a malware family to which a malware sample belongs. A method can include receiving, by a computer system, a collection of malware signature samples for a malware family, identifying a test malware sample for testing whether the collection of malware signature samples includes a malware sample that causes generation of at least one malware detection rule that does not satisfy rule quality criteria, injecting the test malware sample into the collection, simulating sequence generation of the collection based on: applying the at least one rule to the collection to cause the collection to generate malware signature sequences, and generating a count indicating a quantity of the generated malware signature sequences, then determining whether the count satisfies family inclusion criteria, and adding the test malware sample to a dictionary for the malware family based on determining the count satisfies the family inclusion criteria.

20 Claims, 12 Drawing Sheets

(56)     References Cited

U.S. PATENT DOCUMENTS

| 8,261,344 | B2 | 9/2012 | Godwood et al. |
| 8,806,641 | B1 | 8/2014 | Tan et al. |
| 9,483,643 | B1 | 11/2016 | Yun |
| 9,542,556 | B2 | 1/2017 | Sanders |
| 10,867,039 | B2 | 12/2020 | Gordeychik et al. |
| 11,516,227 | B1 * | 11/2022 | Bakthavatchalam ...................... H04L 45/74591 |
| 2016/0094564 | A1 | 3/2016 | Mohandas et al. |
| 2017/0083703 | A1 * | 3/2017 | Abbasi ................. G06F 21/561 |
| 2020/0036732 | A1 * | 1/2020 | Grubel ................. G06F 21/564 |
| 2023/0351016 | A1 * | 11/2023 | Radu .................... G06F 21/577 |
| 2024/0022577 | A1 * | 1/2024 | Fu ...................... H04L 63/1425 |

OTHER PUBLICATIONS

Raff et al., "Automatic Yara Rule Generation Using Biclustering," Proceedings of the 13th ACM Workshop on Artificial Intelligence and Security, Nov. 2020, 71-82.

* cited by examiner

FIG. 1A

Malware Rule System 250

G

136  Present the output

I

138  Receive user input to generate one or more malware rules based on the output

J

134  Generate and return output

H

User Device 104

132  Generate one or more malware rules for the at least one family based at least in part on the sample

G

130  Add the sample to a dictionary for the at least one family based on satisfying the one or more criteria

F

128  Determine whether test output satisfies one or more family criteria

E

Computer System 102

120  Receive malware families

A

122  Receive malware sample(s)

B

Network(s) 108

124  Inject sample(s) into at least one malware family

C

126  Test the at least one family with the injected sample

D

Data Store 106

100

400
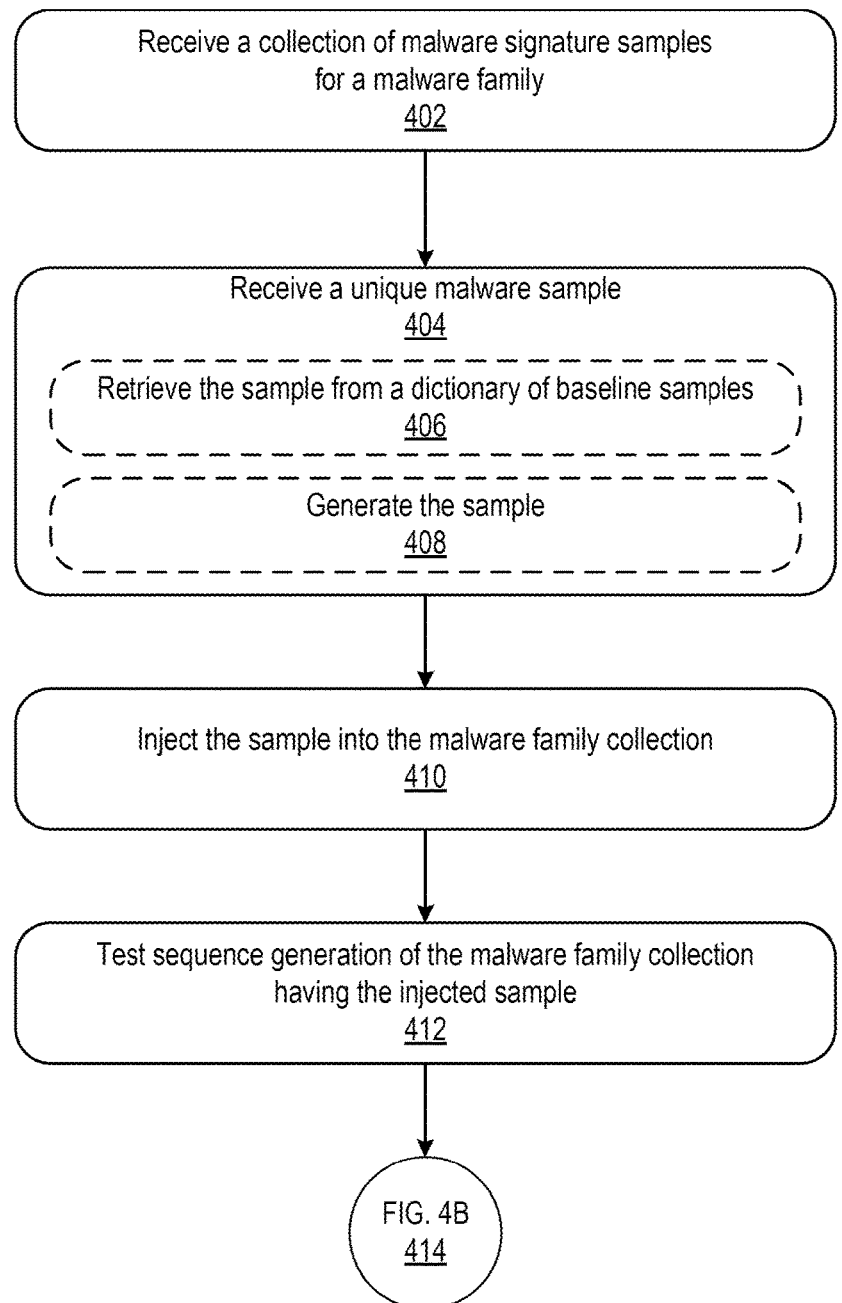
Receive a collection of malware signature samples
for a malware family
402
Receive a unique malware sample
404
Retrieve the sample from a dictionary of baseline samples
406
Generate the sample
408
Inject the sample into the malware family collection
410
Test sequence generation of the malware family collection
having the injected sample
412
FIG. 4B
414
FIG. 4A

500

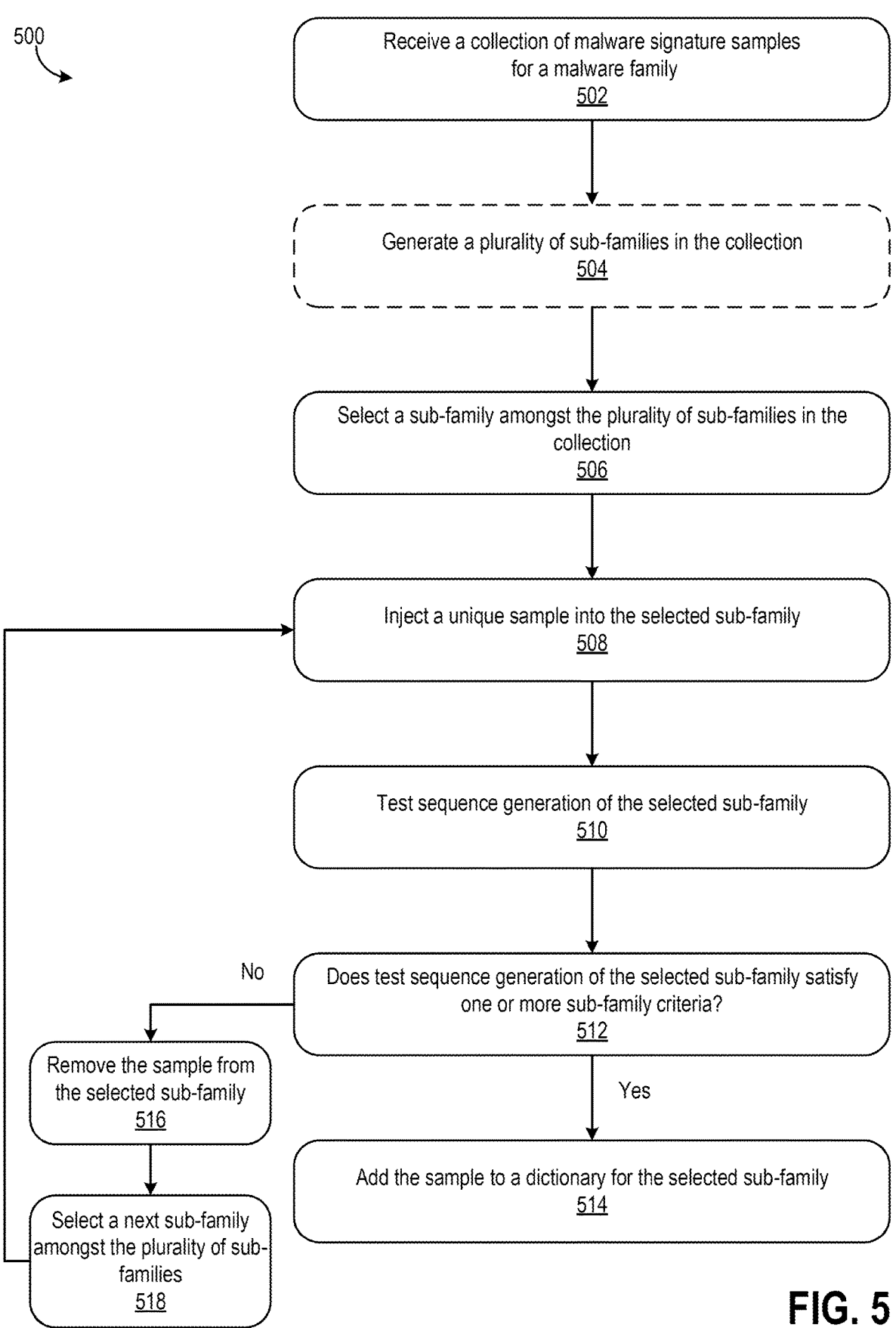

Receive a collection of malware signature samples
for a malware family
502

Generate a plurality of sub-families in the collection
504

Select a sub-family amongst the plurality of sub-families in the
collection
506

Inject a unique sample into the selected sub-family
508

Test sequence generation of the selected sub-family
510

Does test sequence generation of the selected sub-family satisfy
one or more sub-family criteria?
512

No

Remove the sample from
the selected sub-family
516

Yes

Add the sample to a dictionary for the selected sub-family
514

Select a next sub-family
amongst the plurality of sub-
families
518

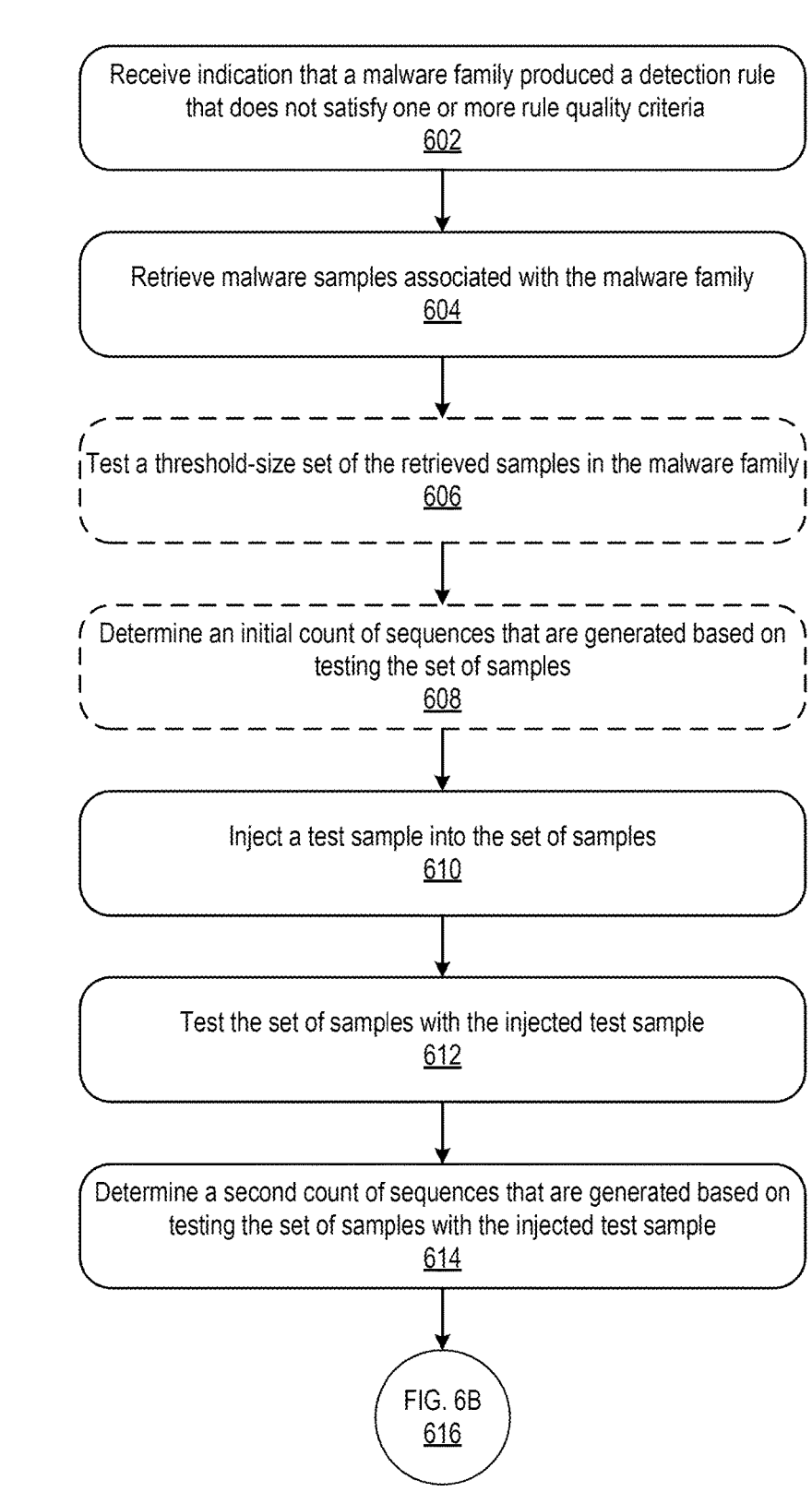

Receive indication that a malware family produced a detection rule
that does not satisfy one or more rule quality criteria
602

Retrieve malware samples associated with the malware family
604

Test a threshold-size set of the retrieved samples in the malware family
606

Determine an initial count of sequences that are generated based on
testing the set of samples
608

Inject a test sample into the set of samples
610

Test the set of samples with the injected test sample
612

Determine a second count of sequences that are generated based on
testing the set of samples with the injected test sample
614

SYSTEMS AND METHODS FOR DETERMINING AND DETECTING MALWARE FAMILIES

TECHNICAL FIELD

This document generally describes devices, systems, and methods related to automatically identifying byte sequences unique to different malware families.

BACKGROUND

Malware can exist in files or other network traffic. Those files or network traffic can enter a computing system, device, and/or network of systems or devices to infect such components, which can cause any of a variety of problems, such as cybersecurity breaches, ransomware, and others. Malware on a particular device in an internal network, such as an enterprise infrastructure, can also spread to other devices connected to the particular device or otherwise in communication in the internal network.

Malware can be categorized into different groups called malware families. A malware family can be made up of malware applications, programs, or files having some level of code base overlap or other similarities. Grouping malware as a family can broaden the scope of a single piece of malware as it alters over time, thereby creating a new piece of malware with distinct family traits. Malware that is part of a family can share common characteristics, such as similar or same byte sequences in malware files, attribution to same author(s), and/or similar attack techniques. Malware files can adapt or change over time, thereby making it challenging to detect variations of malware files before they infiltrate a system, device, or network.

Malware detection systems can be implemented by enterprises, organizations, or other entities to determine whether malicious files are attempting to infiltrate or have infiltrated systems, devices, and/or networks. A malware detection system can use various techniques to detect malware. For example, the malware detection system can use signature-based detection techniques, check-summing, application allow-listing, and/or machine learning behavioral analysis.

SUMMARY

The document generally describes systems, methods, and techniques for identifying which malware families malware samples belong to. The disclosed technology can be used to identify malware family members such as by layering different malware samples into a family dictionary (e.g., directory), running one or more malware detection rules on the dictionary (or otherwise testing the samples in the dictionary) and comparing how many and/or what sequences result. The comparison can be performed to determine whether one or more of the samples in the dictionary actually belong in the malware family. If the sample belongs in the malware family, then the sample can be added to a dictionary that is used to generate malware detection rules for that family. If the sample does not belong in the malware family, then the disclosed techniques can be iteratively performed to determine which, if any, of the malware families the sample belongs to.

More specifically, the disclosed technology can provide for identification of malware families, including differentiating between distinct malware families and different versions of the same family. As an illustrative example, a subset of samples associated with a malware family can be placed in a dictionary (e.g., directory). Signature sequences can be generated from the samples in the dictionary using newly written and/or pre-existing malware detection rules. Dataset-cleansing techniques can be used in some implementations to run the dictionary with a baseline set of samples and inject extra samples into the baseline to see what effect the injected samples have on the malware detection rules and resulting signature sequences. The resulting sequences can be compared, for example, to original or known sequences for the family to identify which injected sample(s) caused a significant drop in a quantity of sequences generated and/or which sequences are most different from original or known sequences for the family. Injected samples that satisfy one or more of those criteria (or other criteria) may not be part of the family and therefore can be removed from the dictionary for that family. As another example, if there is a minor change in the quantity of resulting sequences, the resulting sequences are similar but not identical to original or known sequences for the family, and/or there is a significant increase in the quantity of resulting sequences, then it is likely that the injected sample(s) is a version of the family and can remain in the dictionary for that family. The dictionary can then be used to generate detection rules for that malware family.

The disclosed technology can be used during a deconfliction phase of malware detection rule generation to ensure that correct family members are added to a dictionary for use in generating a robust set of malware detection rules that correspond to that family. The disclosed technology may also be used to identify different versioning of a family so that malware detection rules generated from the dictionary of family members may accurately detect different versions of the family. Moreover, the disclosed technology can be used to prevent deconfliction across family members, thereby ensuring that all instances of the family are identified and used for generation of a robust set of malware detection rules corresponding to that family.

Malware detection rules that are generated using the dictionary of sequences unique to a particular family can be used by various components within a network to automatically and quickly detect malware that is attempting to be transmitted to devices within the network, and can use those automatic detections to prevent such malware attacks. A well-crafted malware detection rule can permit for efficient processing and determination of malware and can also minimize the number of false negatives (e.g., incorrect identification that malicious network traffic or another file is not malware) and/or false positives (e.g., incorrect identification that benign network traffic or another file is malware). When expanding individual malware detection rules to a set of rules that work in concert to identify malware across a population of potential malware threats, rule generation and maintenance can become even more challenging as the possibility of false positives and/or negatives, which can increase due to a larger pool of features that are being searched for via the rules. The disclosed technology therefore provides for accurate identification of sequences associated with different malware families such that sets of rules can be automatically determined and generated to detect the different types of malware while also minimizing false positives and false negatives. Additionally, the disclosed technology can leverage byte sequences instead of performing other, more computationally complex operations (e.g., string analysis, regex operations), which can permit for more efficient runtime rule performance and evaluation.

One or more embodiments described herein can include a method for identifying a malware family to which a malware sample belongs, the method including: receiving, by a computer system, a collection of malware signature samples for a malware family, identifying, by the computer system, a test malware sample, the test malware sample being used, by the computer system, to test whether the collection of malware signature samples includes a malware sample that causes generation of at least one malware detection rule that does not satisfy one or more rule quality criteria, injecting, by the computer system, the test malware sample into the collection of malware signature samples, simulating, by the computer system, sequence generation of the collection of malware signature samples based on: applying the at least one malware detection rule to the collection of malware signature samples to cause the collection of malware signature samples to generate malware signature sequences, the collection of malware signature samples including the injected test malware sample, and generating a count indicating a quantity of the generated malware signature sequences, determining, by the computer system, whether the count satisfies one or more family inclusion criteria, adding, by the computer system, the test malware sample to a dictionary of malware samples for the malware family based on a determination that the count satisfies the one or more family inclusion criteria, and returning, by the computer system, the dictionary for the malware family to be used for updating or generating the at least one malware detection rule for the malware family.

In some implementations, the embodiments described herein can optionally include one or more of the following features. For example, identifying, by the computer system, a test malware sample can include retrieving the test malware sample from the dictionary of malware samples for the malware family. Injecting, by the computer system, the test malware sample into the collection of malware signature samples can include: identifying a subset of malware signature samples amongst the collection of malware signature samples and injecting the test malware sample into the subset of the collection of malware signature samples, the test malware sample being a malware sample in the collection of malware signature samples that was not included in the subset of the malware signature samples. In some implementations, determining, by the computer system, whether the count satisfies one or more family inclusion criteria can include determining that injecting the test malware sample into the collection causes the count to be within a threshold range of an initial count of malware signature sequences generated by the collection, the initial count having been generated, by the computer system, before the test malware sample was injected into the collection. Sometimes, determining, by the computer system, whether the count satisfies one or more family inclusion criteria can include determining that injecting the test malware sample into the collection causes the count to be greater than a threshold count. Sometimes, determining, by the computer system, whether the count satisfies one or more family inclusion criteria can include determining that injecting the test malware sample into the collection causes a similar or same type of malware signature sequences to be generated as a type of malware signature sequences generated by the collection before the test malware sample was injected into the collection.

As another example, the method can include removing, by the computer system, the test malware sample from the collection based on a determination that the count does not satisfy the one or more family inclusion criteria. The method can include generating, by the computer system, one or more malware detection rules for the malware family based at least in part on the test malware sample that was added to the dictionary for the malware family. Sometimes, returning, by the computer system, the dictionary for the malware family can include transmitting the dictionary to a malware rule engine that can be configured to perform at least one of: (i) updating the at least one malware detection rule, (ii) generating one or more malware detection rules for the malware family based on the dictionary for the malware family, or (iii) identify malware instances in network traffic using the updated at least one malware detection rule or the generated one or more malware detection rules.

Sometimes, the method can also include generating, by the computer system, a sub-family of malware signature samples from the collection of malware signature samples, injecting, by the computer system, the test malware sample into the sub-family, simulating, by the computer system, sequence generation of the sub-family that includes the test malware sample, determining, by the computer system, whether the simulated sequence generation of the sub-family satisfies one or more sub-family inclusion criteria, annotating, by the computer system, the test malware sample as being a member of the sub-family based on a determination that the one or more sub-family inclusion criteria is satisfied, and adding, by the computer system, the annotated test malware sample to at least one of: the dictionary for the malware family or a dictionary for the sub-family. The sub-family can include malware signature samples from the collection that have at least one of a same: versioning, obfuscator, or portion of a byte sequence.

In some implementations, the method can also include retrieving, by the computer system, a threshold-size set of malware signature samples for the malware family, simulating, by the computer system, sequence generation of the threshold-size set of malware signature samples, generating, by the computer system, a baseline count indicating a quantity of malware signature sequences that are generated during the simulating, and comparing, by the computer system, the count to the baseline count to determine whether the count satisfies the one or more family inclusion criteria. The threshold-size set can be one malware signature sample for the malware family. The threshold-size set can be two malware signature samples for the malware family. The method can also include injecting, by the computer system, the test malware sample into the threshold-size set of malware signature samples for the malware family and simulating, by the computer system, sequence generation of the threshold-size set of malware signature samples that includes the injected test malware sample. The method can also include injecting, by the computer system, another test malware sample into the threshold-size set of malware signature samples and simulating, by the computer system, sequence generation of the threshold-size set of malware signature samples that includes (i) the injected test malware sample and (ii) the another test malware sample. The method may also include iteratively performing, by the computer system, the injecting and simulating steps until the threshold-size set of malware signature samples includes a total quantity of the malware signature samples for the malware family less one malware signature sample.

One or more preferred embodiments can include a system for identifying a malware family to which a malware sample belongs, the system including: a computer system that can be configured to generate malware detection rules for at least one malware family, a data store that can be configured to receive and store the malware detection rules generated by the computer system, and a rule engine that can be configured to retrieve the malware detection rules from the data store and detect, using the retrieved malware detection rules, malware instances in network traffic. The computer system can include processors and memory and can be configured to perform operations including: retrieving, from the data store, a collection of malware signature samples for a malware family, identifying a test malware sample, the test malware sample being used, by the computer system, to test whether the collection of malware signature samples includes a malware sample that causes generation of at least one malware detection rule that does not satisfy one or more rule quality criteria, injecting the test malware sample into the collection of malware signature samples, simulating sequence generation of the collection of malware signature samples based on: applying the at least one malware detection rule to the collection of malware signature samples to cause the collection of malware signature samples to generate malware signature sequences, the collection of malware signature samples including the injected test malware sample, and generating a count indicating a quantity of the generated malware signature sequences, determining whether the count satisfies one or more family inclusion criteria, adding the test malware sample to a dictionary of malware samples for the malware family based on a determination that the count satisfies the one or more family inclusion criteria, and returning the dictionary for the malware family to be used for updating or generating the at least one malware detection rule for the malware family.

The system can optionally include one or more of the abovementioned features and/or one or more of the following features. For example, the computer system can be configured to perform operations including transmitting the dictionary for the malware family to the rule engine, and the rule engine can be configured to perform operations including generating one or more malware detection rules for the malware family based at least in part on the dictionary. The rule engine can be configured to perform operations including detecting the malware instances in the network traffic based on the generated one or more malware detection rules.

The devices, system, and techniques described herein may provide one or more of the following advantages. For example, the disclosed technology can provide for accurate identification of malware samples unique to particular malware families, which can result in more accurate malware detection rule generation. Malware samples can be injected one at a time into predetermined-size sets of malware samples of a malware family to test whether the malware sample is part of that malware family. This approach allows for more accurate identification of which malware samples belong to which malware families. Similarly, the disclosed techniques can be used to generate sub-families of malware families, thereby increasing fidelity of malware sample families used for malware detection rule generation.

The disclosed techniques can further provide for improving accuracy and fidelity in identifying malware families. Generation of sub-families allows for relevant users to identify variations of a same malware family. The variations of the malware family can be treated similarly, such as being used to generate a single set of rules that applies to all the versions of the malware family. Generating the single set of rules can advantageously provide for generation of more accurate rules and streamlined processing. For example, the disclosed techniques can improve existing technology and computing systems used for generating malware detection rules. The disclosed techniques allow for more efficient use of available computing resources and processing power by streamlining the identification of malware samples and generation of malware detection rules based on the identified malware samples. Since the available computing resources and processing power are used more efficiently, such resources can also be leveraged for more accurate and efficient real-time monitoring of a network for potential security intrusions using the malware detection rules. The available computing resources and processing power can also be used more efficiently in a feedback loop as part of updating and/or modifying malware families and malware detection rules in real-time and/or near real-time. Similarly, the available computing resources can be used to generate malware detection rules that apply to various versions of a particular malware family rather than partitioning the available computing resources to be used in generating multiple sets of rules for variations of a malware family.

Moreover, the disclosed technology may reduce false positives during malware detection rule generation, which can result in more accurate rules that are capable of detecting variations in specific malware families. As an example, unlike traditional YARA rule generation that focuses on malware in x86 code, the disclosed technology accounts for higher-level interpretative languages, such as C#, to be able to capture many different malware families and variations in those malware families and then generate more accurate YARA rules. By analyzing malware files in various different constraints and/or languages, the disclosed technology provides comprehensive rule generation such that the resulting rules can accurately identify different types of malware families and malware families that may go unnoticed with some traditional YARA rules.

Byte-sequence-based rule generation and execution is also beneficially more efficient for use by a rule engine than other rule generation and execution techniques. Traditionally examining long sequences of strings can be a time-consuming and computationally intensive process. The disclosed technology provides lightweight techniques for quickly checking whether particular small byte sequences exist or not in network files and malware file instances, thereby utilizing less compute resources and requiring less processing power during rule generation as well as runtime execution of such rule(s).

As another example, the disclosed technology reduces an amount of time that analysts typically may spend to analyze malware families, identify unique sequences in those families, and subsequently generate family-specific malware detection rules. Similarly, the disclosed technology allows an analyst to manage large quantities of malware detection rules for large quantities of malware families. The disclosed technology also provides for automatically and routinely, or continuously, identifying new unique sequences for malware families and variants of those sequences (e.g., such as by wildcarding known sequences for the malware families). A running count and log of sequences associated with each malware family can be maintained and continuously updated, which consequently results in efficiently updating and generating malware detection rules. The resulting malware detection rules can more accurately identify and respond to variants of malware families as they are generated and/or released into networks, thereby providing improved security and protection for systems, devices, and networks of enterprises, organizations, and other entities.

The details of one or more implementations are set forth in the accompanying drawings and the description below. Other features and advantages will be apparent from the description and drawings, and from the claims.

BRIEF DESCRIPTION OF THE DRAWINGS

FIG. 1A is a conceptual diagram of a system for identifying a malware family that a malware sample belongs to.

FIGS. 4A-B is a flowchart of a process for determining whether a malware sample belongs to a particular malware family.

FIG. 5 is a flowchart of a process for determining whether a malware sample belongs to a sub-family of a particular malware family.

FIGS. 6A-B is a flowchart of another process for determining whether a malware sample belongs to a particular malware family.

Like reference symbols in the various drawings indicate like elements.

DETAILED DESCRIPTION OF ILLUSTRATIVE EMBODIMENTS

Figure 1B:
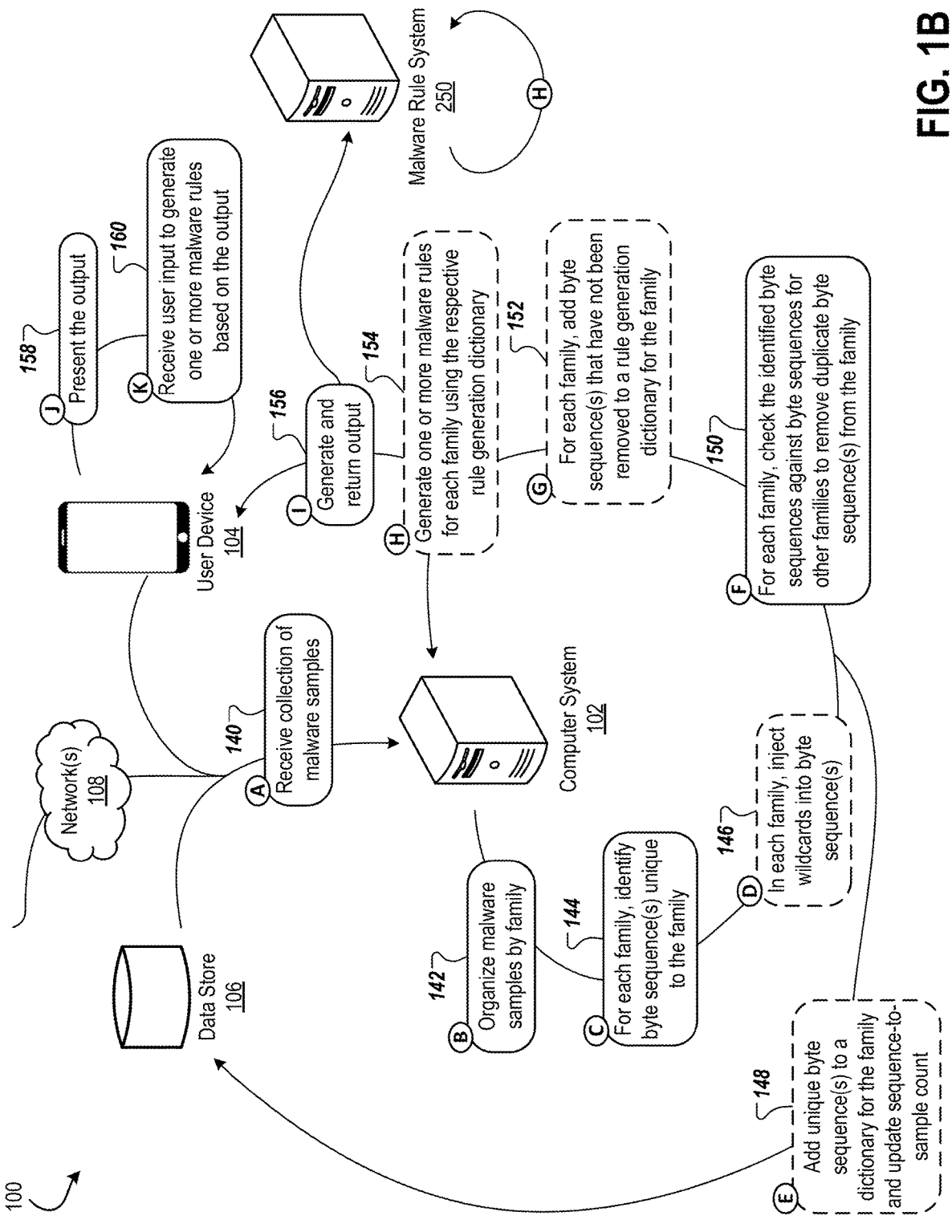
FIG. 1B is a conceptual diagram of a system for identifying signature sequences of particular malware families and generating family-specific malware detection rules using the respective signature sequences.

This document generally relates to technology for identifying malware families that byte sequences belong to. The disclosed technology can therefore be used to identify malware family members such as by layering different malware samples into a family dictionary (e.g., directory), running one or more malware detection rules on the dictionary (or otherwise testing the sequences in the dictionary) and comparing how many and/or what unique byte sequences result. Dataset-cleansing techniques can be used to iteratively inject a sample into the family dictionary and test sequence generation of the dictionary to determine whether the injected sample is part of the particular malware family. If the injected sample belongs in the malware family, then the sample can be added to the family dictionary that is used to generate malware detection rules for that family. If the sample does not belong in the malware family, then the disclosed techniques can be iteratively performed to identify which, if any, malware family the sample belongs to.

The disclosed techniques can be performed as part of a process for identifying byte sequences unique to particular malware families and generating robust malware detection rules based on the identified byte sequences for each malware family. For example, byte sequences that are unique to every file in a particular malware family can be identified during a first phase and maintained in a dictionary with a count indicating a quantity of files having each of the unique byte sequences. In a second, deconfliction phase, the identified sequences in the dictionary can be checked against unique byte sequences that have been identified for other malware families. Conflicting sequences can be eliminated from the dictionary for the particular malware family to reduce false positives. The disclosed techniques can be performed as part of the second deconfliction phase. After the second phase, the resulting dictionary can be used to generate and/or update malware detection rules for the particular malware family. The rules can include, but are not limited to, YARA rules. The generated rules can be used to detect and/or identify malware in network traffic (or other files) before the network traffic enters an internal network, such as a network of computing devices in an enterprise's internal infrastructure.

Referring to the figures, FIG. 1A is a conceptual diagram of a system 100 for identifying a malware family that a malware sample belongs to. In other words, the system 100 can be used to determine whether a unique byte sequence belongs in a particular malware family.

A computer system 102, user device 104, data store 106, and malware rule system 250 can communicate (e.g., wired and/or wirelessly) via network(s) 108. The network(s) 108 can be internal to an enterprise's infrastructure, such as an internal network of computing systems and devices associated with the enterprise. The network(s) 108 can additionally or alternatively be external to the enterprise's infrastructure and can also include communication with other components, systems, devices, and/or networks that may not be part of the enterprise's infrastructure.

In brief, the computer system 102 can be configured to identify signature sequences that are unique to various malware families, generate dictionaries of unique sequences for the malware families, and compare the unique sequences of each malware family with sequences of other malware families to generate curated sets of signature sequences for the respective malware families. The computer system 102 may also generate malware detection rules using the curated sets of signature sequences that are generated for the respective malware families. The computer system 102 can be any type of computing system, computing device, and/or network of computing systems or devices that can perform the techniques described herein. In some implementations, the computer system 102 can be internal to the enterprise's infrastructure. In other words, the computer system 102 can be part of the enterprise's internal network. In some implementations, the computer system 102 may be remote from the enterprise's internal network.

The user device 104 can be any type of computing device such as a computer, laptop, smartphone, mobile phone, tablet, and/or wearable device. The user device 104 can be part of the enterprise's internal network or remote. The user device 104 can be used by a user associated with the enterprise, such as an analyst or other user who generates, manages, and/or updates malware detection rules. The user device 104 can also be used by any other user that is in charge of security for the enterprise's internal network.

The data store 106 can be any type of data storage, data library, database, and/or cloud-based storage configured to store dictionaries (e.g., directories) of signature sequences for malware families and malware detection rules. The data store 106 may also maintain other relevant information for the disclosed techniques and the enterprise as a whole. The data store 106 can be part of the computer system 102. The data store 106 can be part of the enterprise's internal network. Sometimes, the data store 106 can be remote from the enterprise's internal network.

The malware rule system 250 can be any type of computing system, device, and/or network of computers or devices that is configured to detect malware and other malicious files that attempt to infiltrate the enterprise's internal network. As shown in FIG. 2B, the malware rule system 250 can sit on an edge of the enterprise's internal network and monitor network traffic or other files before the traffic (or files) enters the internal network. The malware rule system 250 can implement one or more malware detection rules described herein to detect and stop malware before it infiltrates the internal network. Sometimes, the malware rule system 250 can be part of the computer system 102. As shown in FIG. 1A, the malware rule system 250 can also be separate from the computer system 102.

Still referring to the system 100 in FIG. 1A, the computer system 102 can receive malware families in block A (120). At least one malware family can be received from one or more computing systems or devices communicating with the computer system 102 via the network(s) 108. The malware family can be received or requested from the user device 104 by the computer system 102. The malware family can be received or retrieved from the data store 106. Receiving the at least one malware family can include receiving a set of malware samples, or signature sequences, that have been identified with or otherwise associated with the particular malware family. The set can include all malware samples identified for the particular family. The set can also include a predetermined amount of malware samples identified for the particular family. In some implementations, the amount of malware samples that are received in block A (120) can be incremented as the computer system 102 continues to test whether a malware sample belongs in the particular malware family.

The computer system 102 can also receive at least one malware sample in block B (122). The malware sample can be received from the data store 106, the user device 104, and/or another computing system or device that communicates with the computer system 102 via the network(s) 108. Refer to block A (120) for further discussion. The malware sample received in block B (122) can be identified when the malware rule system 250 executes malware detection rules to check network traffic or other files of the enterprise's internal network. For example, the malware rule system 250 can identify the malware sample as one that has not been previously identified and/or addressed during runtime execution of the malware detection rules. The malware rule system 250 can transmit, to the computer system 102 via the network(s) 108, the identified malware sample. The computer system 102 can then inject that sample into one or more malware families to determine which family the sample belongs to.

The malware sample can be retrieved from a dictionary or directory of files including variations of malware samples in block B (122) (e.g., from the data store 106). In some implementations, the computer system 102 can generate the malware sample using code cleansing techniques or other techniques to randomly generate the sample from samples in the dictionary or directory of files.

In yet some implementations, the malware sample received in block B (122) can be a malware sample that has been previously identified for a particular malware family. The computer system 102 can inject that malware sample back into the particular malware family using the disclosed techniques to determine whether that malware sample negatively impacts generation of malware detection rules for the particular malware family. If that malware sample negatively impacts the generation of rules for the family, then that malware sample can be removed from the particular malware family or otherwise disassociated with the family.

In block C, the computer system 102 can inject the malware sample(s) into at least one malware family (124). For example, the computer system 102 can determine whether the malware sample is part of a particular malware family. The malware sample can be added to a set of malware samples for the particular malware family that is received in block A (120).

The computer system 102 can test (e.g., simulate) the at least one family with the injected sample in block D (126). For example, the computer system 102 can run malware detection rules that have been generated for the particular malware family on the set of malware samples that includes the injected sample. The rules can be run on the set of malware samples for the particular malware family in order to test whether injected the malware sample into the malware family causes the malware detection rules to perform better or worse. If the malware detection rules perform better (e.g., satisfies one or more criteria) as a result of injecting the sample into the set of samples for the particular malware family, then the injected sample is likely a member of the particular malware family. On the other hand, if the malware detection rules perform worse (e.g., does not satisfy the one or more criteria) after injecting the sample into the set, then the injected sample is likely not a member of the particular malware family.

The computer system 102 can determine whether output from the test (e.g., a count indicating how many malware signature sequences are generated as a result of the testing or simulation) satisfies one or more family criteria in block E (128). The one or more criteria can be used to determine whether the injected sample is part of the malware family. For example, the test output may satisfy criteria if the test output indicates that at least a threshold quantity of malware sequences are generated as a result of running the rules on the set of malware samples including the injected sample. The test output may satisfy criteria if the test output indicates that the resulting quantity of malware sequences is greater than an original quantity of malware sequences that are generated when the set of samples are tested without the injected sample. The test output may satisfy criteria if the test output indicates that the resulting quantity of malware sequences is the same as the original quantity of malware sequences. The test output may satisfy criteria if running the malware detection rules causes a certain type of malware sequence to be generated. As another example, the test output may not satisfy the criteria if the resulting quantity of malware sequences is less than the original quantity of malware sequences. The test output may not satisfy the criteria if, as another example, the resulting quantity of malware sequences is less than a threshold quantity of malware sequences that should be generated as a result of running the malware detection rules. One or more other criteria are also possible and may be used to determine, in block E (128), whether the injected sample is part of the particular malware family.

Optionally, the computer system 102 can add the sample to a dictionary for the at least one family based on satisfying the one or more criteria (block F, 130). Block F (130) can include storing the sample in the data store 106 in association with the at least one family. Since the sample is added to the dictionary for the particular malware family, the sample may be used in future generation, updating, and/or modification of malware detection rules for the particular malware family.

On the other hand, if the one or more criteria is not satisfied, then the injected sample may be removed from the set of samples. In some implementations, the sample can be injected into another set of samples associated with the particular malware family. The another set of samples can include one or more same or different samples that were part of the set of samples described above. In some implementations, the sample can remain in the set of samples and the computer system 102 can add one or more additional or other samples to the set of samples, then repeat the blocks D-E (126-128) to determine whether the samples that were added to the set are in fact part of the particular malware family. The samples that are added to the set can be retrieved from the dictionary of baseline samples, a dictionary of samples that are associated with the particular malware family, or any other type of sample described herein.

In yet some implementations, once the sample is removed from the set of samples for the particular malware family, the computer system 102 can inject the malware sample into sets of malware samples for one or more other malware families. The computer system 102 can perform blocks C-F (124-130) for each malware family to determine which malware family, if any, the injected malware sample belongs to. In some implementations, the computer system 102 can leverage available computing resources by testing the sample in various sets of malware samples for various different malware families in parallel. As a result, the computer system 102 may more efficiently and quickly identify which malware family the injected sample belongs to.

Optionally, the computer system 102 can generate one or more malware rules for the at least one family based at least in part on the sample (block G, 132). Sometimes, the malware rule system 250 can perform block G (132), after the computer system 102 performs block H (134), described further below. As part of block G (132), the computer system 102 can retrieve one or more malware detection rules that have been generated in association with the particular malware family. The computer system 102 can update the malware detection rules using the dictionary, which also includes the sample that was identified and added in blocks E-F (128-130). In some implementations, the computer system 102 can generate one or more new malware detection rules based on the injected sample being added to the dictionary for the particular malware family.

The computer system 102 can generate and/or update the malware detection rules whenever at least one malware sample is added to the dictionary for the particular malware family. The computer system 102 can generate and/or update the rules at predetermined time intervals, such as whenever a threshold quantity of malware samples are added to the dictionary and/or every 1 minute, 5 minutes, 10 minutes, 30 minutes, 1 hour, 5 hours, 12 hours, 24 hours, etc. In some implementations, the computer system 102 can generate and/or update the rules whenever computing resources are available for such processing (e.g., when network traffic is low, during downtimes such as in the middle of the night, etc.).

In block H (134), the computer system 102 can generate and return output to the user device 104 and/or the malware rule system 250. The output can include, for example, an indication that the malware sample has been identified for the particular malware family. The output can include the malware sample. The output can include an indication that the malware sample has not been identified for the particular family. Sometimes, the output can indicate that the malware sample has been identified for another malware family. The output can include one or more other information for the particular malware family, including but not limited to the dictionary of samples for the malware family and/or one or more malware detection rules for the malware family.

The user device 104 can present the output in block I (136). For example, the user device 104 can present the output in one or more graphical user interface (GUI) displays. The output can be presented with user-selectable options, graphical elements, buttons, and/or data fields. As a result, the relevant user at the user device 104 can provide user input to perform one or more actions with regards to the presented output.

Accordingly, the user device 104 may receive user input to generate one or more malware detection rules based on the output (block J, 138). The user input can be transmitted to the computer system 102 and/or the malware rule system 250, then used to generate the one or more malware detection rules. One or more other user input may also be received in block J (138) and transmitted to the computer system 102 and/or the malware rule system 250.

FIG. 1B is a conceptual diagram of the system 100 for identifying signature sequences of particular malware families and generating family-specific malware detection rules using the respective signature sequences. The system 100 can include one or more of the components described in reference to FIG. 1A.

In FIG. 1B, the computer system 102 can receive a collection of malware file samples in block A (140). The malware file samples can be received from the data store 106, the user device 104, and/or the network(s) 108. For example, the samples can be previously identified by the computer system 102 and/or the malware rule system 250 then stored in the data store 106. One or more of the samples can be synthetic and thus generated by the computer system 102 and/or the malware rule system 250. One or more of the samples can be identified, generated, and/or selected by a user at the user device 104, then transmitted to the computer system in block A (140).

The computer system 102 can organize the malware file samples by family in block B (142). For example, samples that have common characteristics or characteristics that are known for particular malware families can be grouped together/bucketized. In some implementations, the computer system 102 checks that every sample in a particular malware family is of a main bot for that family. Sometimes, a human analyst can check the samples to determine whether they are part of the main bot for that family.

For each malware family, the computer system 102 can identify byte sequences in signatures of the samples that are unique to the family (block C, 144). The identified byte sequences can be added to a dictionary for the family. Sometimes, blocks B and C (142 and 144, respectively) can be performed as one step.

Optionally, in each malware family, the computer system 102 can inject wildcards into one or more of the byte sequences that had been identified for the family in block C, 144 (block D, 146).

The computer system 102 can optionally add the unique byte sequences to a dictionary for the respective malware family in block E (148). Optionally, the computer system 102 may also update a sequence-to-sample count in the dictionary. The sequence-to-sample count can indicate how many malware file samples in the malware family contain each unique byte sequence that was identified for the family. Sometimes, the count may additionally or alternatively indicate how many samples are identified for the family and/or how many unique byte sequences are identified for the family. The count can be continuously updated, such as whenever new byte sequences are identified for the family and/or new malware file samples are identified as having one or more of the unique byte sequences associated with the family. The dictionary and the associated count can be stored in the data store 106.

Block E (148) can be performed before, during, or after one or more other blocks. Block E (148) can also be performed multiple times. For example, block E (148) can be performed after identifying the unique byte sequences for a malware family (block C, 144) and before injecting wildcards into those sequences (block D, 146). Block E (148) can be performed again after injecting the wildcards. As another example, block E (148) can be performed after organizing the malware samples by family (block B, 142), after identifying the unique byte sequences for a particular malware family (block C, 144), and/or after injecting the wildcards into the sequences for the particular malware family (block D, 146). Block E (148) can also be performed before, during, or after any of the blocks described further below, such as blocks F-K (150-160).

Still referring to FIG. 1B, for each malware family, the computer system 102 can check the identified byte sequences (including the wildcarded sequences) against byte sequences for other malware families (block F, 150). The computer system 102 can then remove any conflicting byte sequences from the malware family. The computer system 102 can utilize a conflict percentage (which can be predetermined by the computer system 102 and/or set by the user at the user device 104) to determine which conflicting byte sequences to keep for the particular malware family and which conflicting byte sequences to remove for that malware family. Block F, 150, can be performed as part of a deconfliction process described throughout this disclosure. Removing the conflicting byte sequences can include removing such sequences from the dictionary associated with the malware family. Removing the conflicting byte sequences may additionally or alternatively include updating the sequence-to-sample count (e.g., lowering the count by a quantity of byte sequences that were removed from the dictionary).

The computer system 102 may optionally add byte sequences that have not been removed for the particular malware family into a rule generation dictionary for that family (block G, 152). The rule generation dictionary can therefore contain a curated, final set of unique byte sequences (including wildcarded sequences) that are associated with the particular malware family. The rule generation dictionary can be different than the dictionary described in reference to block E (148). The rule generation dictionary can be used by the computer system 102 and/or the malware rule system 250 to generate and/or update rules that are used to detect malware associated with the particular malware family. In some implementations, instead of generating the rule generation dictionary, the computer system 102 may simply remove the conflicting byte sequences from the dictionary of block E (148) and use that dictionary to generate and/or update the rules.

In block H (154), the computer system 102 can optionally generate or update one or more malware detection rules for the particular malware family using the respective rule generation dictionary. Sometimes, block H (154) can be additionally or alternatively performed by the malware rule system 250.

The computer system 102 can generate and return output in block I (156). The output can include the dictionary of block E (148) and/or the rule generation dictionary of block G (152). The output can include the sequence-to-sample count and/or other metrics or information that can be useful to the user of the user device 104 in diagnosing the security and malware detection techniques employed in the system 100. The output can include information about one or more of the unique byte sequences for the particular malware family or one or more other malware families. Sometimes, the output can include one or more of the malware detection rules (such as old malware detection rules, updated malware detection rules, and/or newly generated malware detection rules) for the particular malware family or other malware families.

The output can also be transmitted to the malware rule system 250 (block I, 156). The malware rule system 250 can use the output to generate or update one or more of the malware rules for one or more of the malware families (block H, 154).

The user device 104 can present the output in a graphical user interface (GUI) display (block J, 158). For example, the output can be presented in a user-facing interface, mobile application, or other software program.

The user device 104 can receive user input to generate one or more malware rules based on the output (block K, 160). For example, the user can update or generate malware detection rules using the unique byte sequences (and wildcarded sequences) that are part of the dictionary for a particular malware family. The user can also provide instructions indicating that one or more malware detection rules should be updated and/or generated according to the output. These instructions can be provided back to the computer system 102 and/or the malware rule system 250 and used by the system 102 and/or 250 to update or generate the rules.

As described herein, the computer system 102 can identify byte sequences unique to each family in a first phase, deconflict those sequences with sequences of other families in a second phase, and then generate malware detection rules using the sequences for the family that have not been deconflicted. The first phase, for example, can include blocks B-D (142 and 146) and the second phase can include blocks F-G (150 and 152).

Figure 2A:
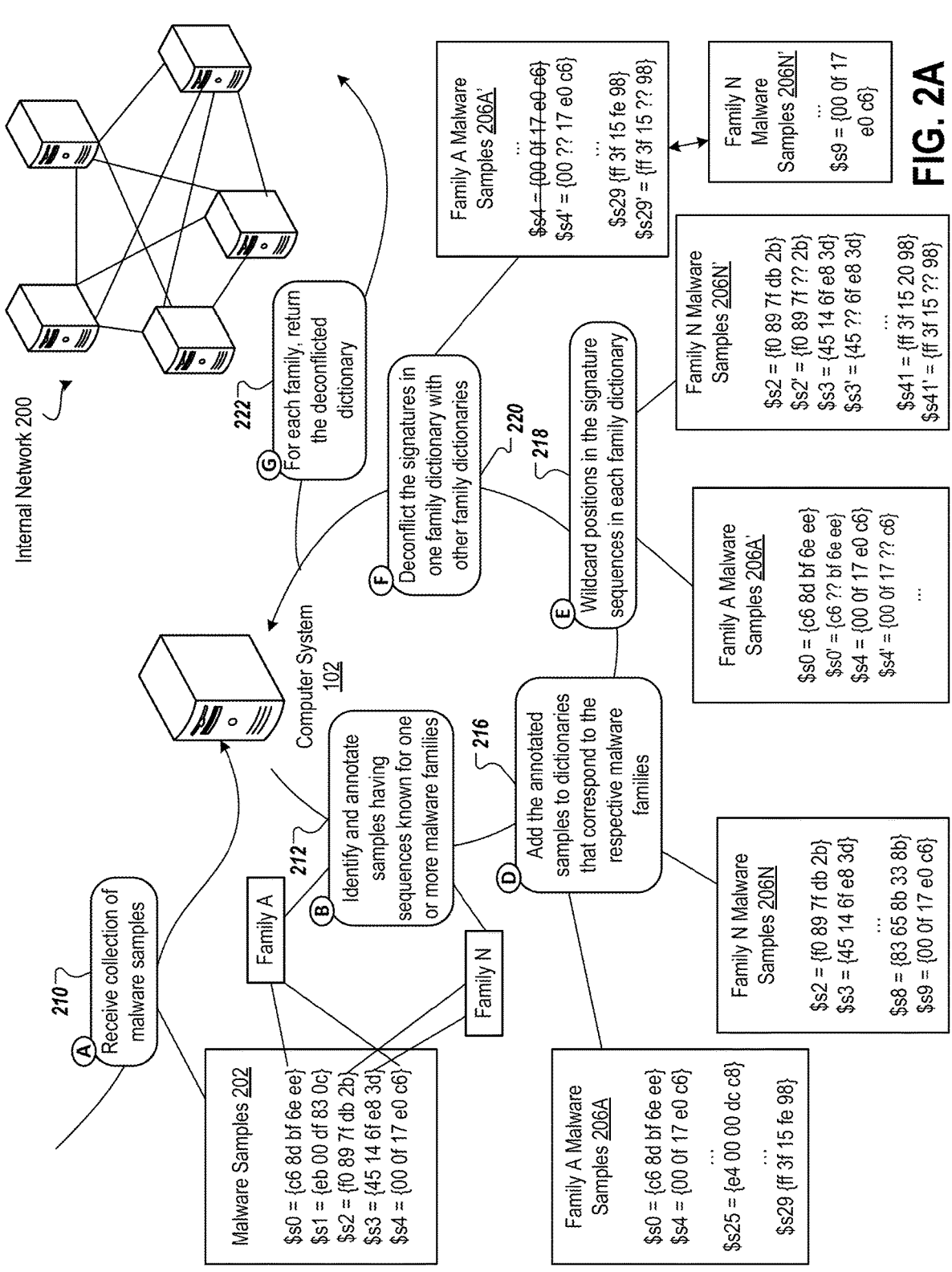
FIG. 2A is a conceptual diagram for building a dictionary of signature sequences unique to a particular malware family.
Figure 2B:
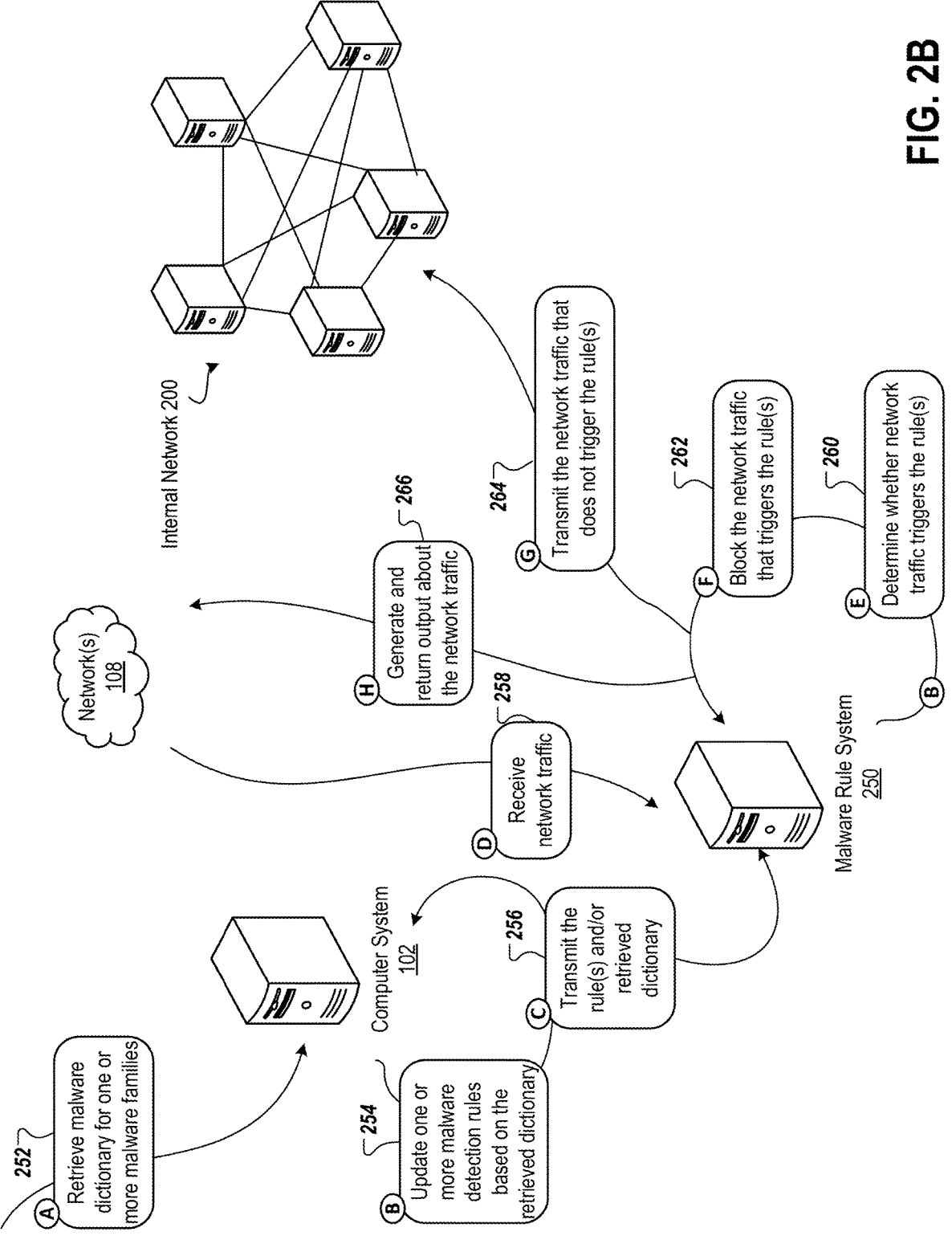
FIG. 2B is a conceptual diagram for generating family-specific malware detection rules using the dictionary of FIG. 2A and implementing the rules in runtime execution to detect malware attempting to infiltrate an enterprise's internal network.

FIG. 2A is a conceptual diagram for building a dictionary of signature sequences unique to a particular malware family. The computer system 102 can receive a collection of malware file samples 202 in block A (210). Refer to block A (140) in FIG. 1B for further discussion. The malware file samples 202 can be received in network traffic as part of network packets or files, such as in the network(s) 108 described in FIG. 1B. The malware file samples 202 can include signature byte sequences. The samples 202 may or may not be associated with particular malware families at the time they are received at the computer system 102. As shown in FIG. 2A, the samples 202 can include any quantity of signatures made up of hexadecimal sequences. The signatures may also be composed of one or more other types of byte sequences, values, and/or strings. The computer system 102 can receive malware samples and non-malware samples. Non-malware samples can be assessed and processed similarly to malware samples. For example, including non-malware samples in a deconfliction phase described herein can reduce false positives of the malware samples.

In block B (212), the computer system 102 can identify and annotate samples in the collection of samples 202 that have sequences known for one or more malware families. For example, the computer system 102 can apply one or more rules to determine whether any of the samples 202 match known sequences (or have a threshold quantity of known sequences) for one or more malware families. The computer system 102 can also apply one or more other techniques and/or rules to identify characteristics in the samples 202 that are common characteristics for one or more malware families.

In the example of FIG. 2A, the computer system 102 identified that signatures $s0 and $s4 contain sequences that are known for malware family A. The signatures $s0 and $s4 have been annotated with a label for malware family A. The computer system 102 also identified that signatures $s2 and $s3 contain sequences that are known for malware family N. The signatures $s2 and $s3 may not have to be in binary near each other in a particular file or malware sample. The signatures $s2 and $s3 have been annotated with a label for malware family N.

In some implementations, the signatures $s0, $s1, $s2, $s3, and $s4 can be byte sequences that are extracted from the signatures received in the samples 202. The computer system 102 can read each sample 202 and identify N-byte sequences therein, where N can be an arbitrary number. The N-byte sequence can be, for example, 5-bytes. The 5-byte sequences that are identified can then be extracted and identified as $s0, $s1, $s2, $s3, and/or $s4. As an illustrative example, $s0 and $s4 can be 5-byte sequences extracted from the same malware signature sample, that signature sample being associated with the malware family A. Other variations and implementations are also possible.

Still referring to FIG. 2A, the computer system 102 can add the annotated samples to dictionaries that correspond to the respective malware families (block D, 216). Here, the signatures $s0 and $s4 have been added to dictionary 206A for family A malware samples. The dictionary 206A also contains one or more other signatures associated with the malware family A, including but not limited to signatures $s25 and $s29. The signatures $s2 and $s3 have been added to dictionary 206N for Family N malware samples. The dictionary 206N also contains other signatures associated with the malware family N, including but not limited to signatures $s8 and $s9.

In block E (218), the computer system 102 can wildcard one or more positions in the signature sequences in each of the family dictionaries. The computer system 102 can inject wildcard sequences into all of the signatures in each dictionary. Sometimes, the computer system 102 may inject wildcard sequences into only some of the signatures in each dictionary. For example, the computer system 102 may inject wildcard sequences into the new signatures that are added to the dictionary in block D (216). As another example, the computer system 102 may inject wildcard sequences into a random subset of the signatures that are in the dictionary, which may or may not include new signatures and older signatures. The computer system 102 may wildcard only some sequence positions in the signatures that would allow for N-byte atoms to exist in the signature. For example, in a signature having five sequence positions, the computer system 102 can inject a wildcard byte sequence at the second or fourth positions in the signature. Wildcard sequences can also be injected into the signatures using other rules and/or criteria. Sometimes, wildcards can be added during a deconfliction phase described further herein.

As shown in FIG. 2A, the computer system 102 updates the dictionary 206A' for malware family A by injecting wildcard sequences into at least the signatures $s0 and $s4. Although not shown, the computer system 102 may also inject wildcard sequences or bytes into one or more other sequences in the dictionary 206A', such as $s25 and/or $s29. The computer system 102 injected a wildcard byte of "??" in the second position in the signature $s0 to generate signature $s0'. The computer system 102 injected a wildcard byte of "??" in the fourth position in the signature $s4 to generate signature $s4'.

As shown in FIG. 2A, the computer system 102 updates the dictionary 206N' for malware family N by injecting wildcard byte sequences into one or more of the signatures.

Although not shown, the computer system 102 may also inject wildcard bytes into one or more other sequences in the dictionary 206N'.

The computer system 102 can then deconflict the signatures in one family dictionary with other family dictionaries in order to generate a curated, final set of signature sequences for the one family (block F, 220). Sometimes, the computer system 102 can remove signatures from the one family dictionary that have a threshold quantity of matching sequences with signatures in the other family dictionaries. Sometimes, the computer system 102 may not remove the signatures from the one family dictionary if a threshold quantity of signatures in that dictionary contain one or more particular sequences, even if the particular sequences appear in signatures of other family dictionaries. As an illustrative example, if a signature in the one family dictionary contains a particular sequence that also appears in less than 20% of samples from another families dictionary, then the signatures containing the particular sequence may remain in the one family dictionary. After all, the signatures containing the particular sequence may in fact be unique to the family associated with that dictionary.

Here, for example, the computer system 102 compared the signature sequences in the dictionary 206A' for malware family A to the signature sequences in the dictionary 206N' for malware family N. The computer system 102 identified one instance of the signature $s4 in the dictionary 206A' that matches the signature $s9 in the dictionary 206N' for the malware family N. As a result, the computer system 102 may remove the signature $s4 from the dictionary 206A' for the malware family A. In this case, the signature $s4 contains all the same sequences as the signature $s9. In some implementations, the signature $s4 may contain some sequences that are different than the sequences in the signature $s9. However, the signature $s4 may still be removed from the family A dictionary 206A' because only one or less than a threshold quantity of signatures in the dictionary 206A' contain the particular sequence that appears in the signature $s9 for the malware family N. On the other hand, if the signature $s4 and at least the threshold quantity of other signatures in the dictionary 206A' contain at least one of the same sequences that appear in the signature $s9 for the malware family N, then the signature $s4 and the threshold quantity of other signatures are not removed from the dictionary 206A'. The presence of the sequence(s) in these signatures can be indicative of a common characteristic for the malware family A.

For each family, the computer system 102 can return the deconflicted dictionary (block G, 222). Returning the deconflicted dictionary can include storing the dictionary in a data store, such as the data store 106. Returning the deconflicted dictionary can also include transmitting the dictionary to the malware rule system 250, as described further in reference to FIG. 2B. Returning the deconflicted dictionary can also include using the dictionary to update and/or generate one or more malware detection rules for the corresponding malware families.

FIG. 2B is a conceptual diagram for generating family-specific malware detection rules using the dictionary of FIG. 2A and implementing the rules in runtime execution to detect malware attempting to infiltrate an enterprise's internal network 200. The rules described herein can be implemented in order to quickly identify potential malware in network traffic or other types of files before the network traffic or files enters the internal network 200 of the enterprise.

As shown in FIG. 2B, the computer system 102 can retrieve a malware dictionary for one or more malware families (block A, 252). For example, the computer system 102 can retrieve the dictionaries 206A' and 206N' for the malware families A and N, respectively.

Using the retrieved dictionary, the computer system 102 can update one or more malware detection rules for the malware family that corresponds to the retrieved dictionary (block B, 254). In some implementations, the retrieved dictionary can be transmitted to the malware rule system 250 (block C, 256) and then the malware rule system 250 can update one or more of the malware detection rules (block B, 254). In some implementations, in addition to or instead of updating the rules by the computer system 102 and/or the malware rule system 250, one or more new malware detection rules can be determined using the signature sequences in the retrieved dictionary.

The rules can be YARA rules, as described herein. One or more other types of malware detection rules may also be updated and/or generated in block B (254). Each of the rules can define different triggering conditions. The rules can also define different actions to be taken (e.g., automatically by the malware rule system 250, manually by a relevant user in the internal network 250) in response to being triggered. Sometimes, updating existing rules can include adding one or more of the signatures or signature sequences from the retrieved dictionary to a trigger condition in the rules. For example, a rule for detecting malware in family A can be triggered if network traffic contains signatures $s25 and/or $s29 shown in FIG. 2A. The computer system 102 and/or the malware rule system 250 can update this rule so that the rule is triggered if network traffic contains signatures $$25, $$29, $s0, $s0', and/or $s4', as shown in FIG. 2A. In some rules, all signature sequences may be required for the rule to be triggered. In some rules, a subset or minimum threshold quantity of signature sequences may be required for the rule to be triggered. In yet some rules, at least one of the signature sequences may be required for the rule to be triggered. Various other implementations of the rules are possible. The rule can also be updated to that the rule is triggered if one or more sequences of the signatures in the retrieved dictionary are identified in network traffic. Various other updates can also be made to the rules so that the rules efficiently and accurately identify malware and variations of malware that may attempt to infiltrate the internal network 200 via the network(s) 108.

The updated and/or generated rule(s) can be transmitted from the computer system 102 to the malware rule system 250 in block C (256). In some implementations in which the rules are updated and/or generated at the malware rule system 250, block C (256) may not be performed. Rather, the malware rule system 250 can retrieve the rules from the data store 106, update the retrieved rules, and/or execute the rules during runtime execution.

The malware rule system 250 can also receive network traffic in block D (258). the network traffic can be received from the network(s) 108. The network traffic can include files of information, data, and/or files that are being routed to the internal network 200 of the enterprise. Before the network traffic can enter the internal network 200, the network traffic can pass through a security wall, which can be the malware rule system 250.

The malware rule system 250 can determine whether any content in the network traffic triggers one or more of the malware detection rules (including previously defined rules, newly generated rules, and/or updated rules) (block E, 260).

The malware rule system 250 can block any of the network traffic that triggers one or more of the malware detection rules (block F, 262). The system 250 may not let that network traffic be transmitted into the internal network 200. The system 250 may also perform one or more other actions responsive to blocking the network traffic. The other actions can be defined by the rule(s) that is triggered.

The malware rule system 250 can also transmit any of the network traffic that does not trigger one or more of the malware detection rules to the internal network 200 (or more particularly, a system or device in the internal network 200 that the transmitted network traffic is intended to be received by) (block G, 264).

The malware rule system 250 can generate and return output about the assessed network traffic in block H (266). The output can be returned to the computer system 102, the data store 106, the user device 104, or any other computing system and/or device in communication via the network(s) 108. The output can indicate how much or what network traffic was blocked in block F (262), what malware detection rules were triggered in block E (260), and/or how much or what network traffic did not trigger any of the rules in block G (264). The output may also indicate one or more responses that the malware detection system 250 took when the network traffic triggered one or more rules in block E (260). In some implementations, the output can indicate one or more particular signatures, signature sequences, and/or malware families that were detected and that triggered one or more of the malware detection rules in block E (260). Various other metrics, data, and information about rule triggering process in blocks E-G (260-264) can also be returned in the output.

Although the disclosed techniques are described with reference to network traffic, the disclosed techniques can also apply to any other type of file.

Figure 3:
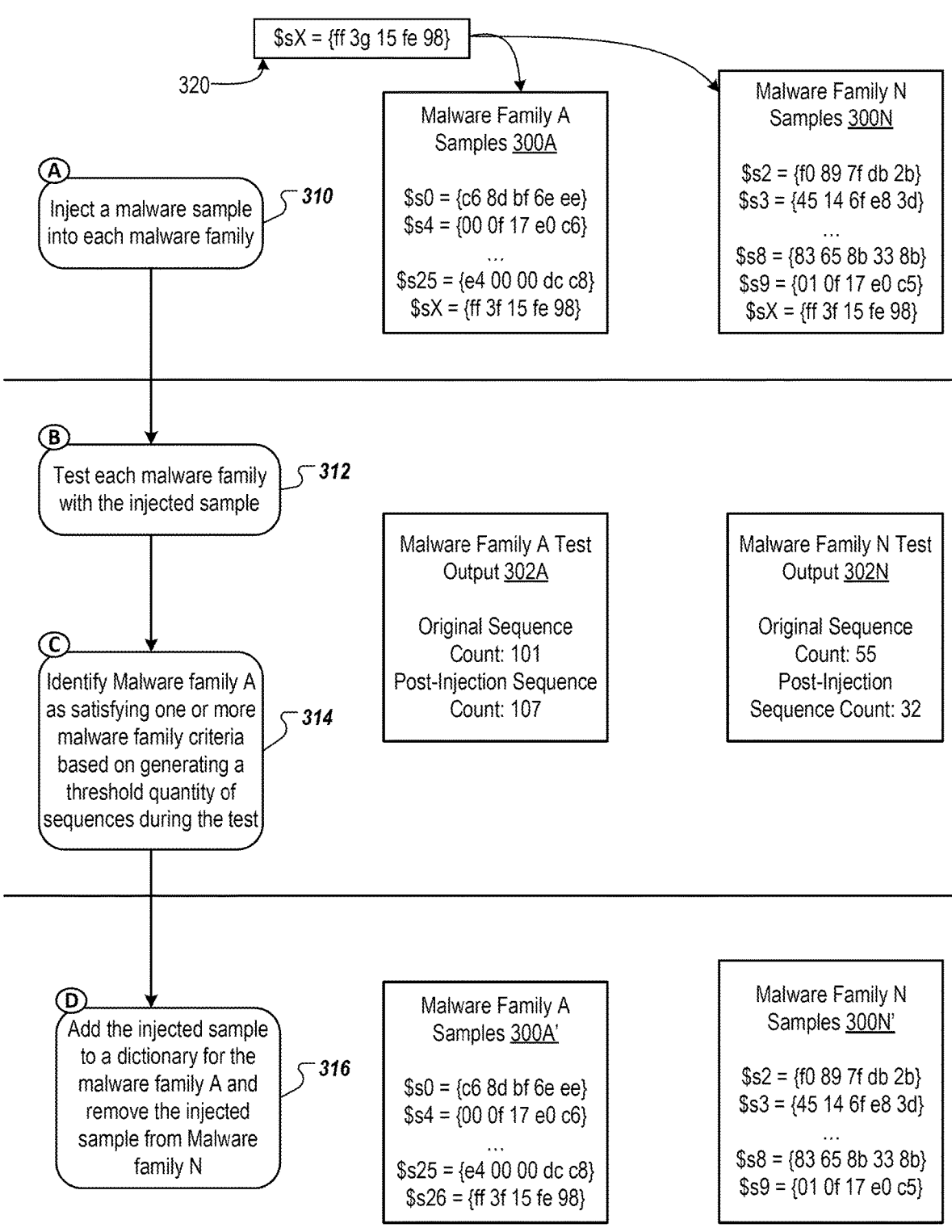
FIG. 3 is a conceptual diagram for identifying a malware family to which a malware sample belongs.

FIG. 3 is a conceptual diagram for identifying a malware family to which a malware sample belongs. For example, the computer system 102 described herein can retrieve or receive a set of malware samples associated with each malware family to be tested. The computer system 102 can test (e.g., simulate) the sets of malware samples to determine, for example, type of malware sequences generated and/or quantity of malware sequences generated as a result of running malware detection rules on those sets of malware samples. Then, the computer system 102 can inject a new sample into each of the sets of malware samples and test the sets of malware samples again. In the second round of testing, the computer system 102 can determine type and/or quantity of malware sequences generated as a result of running the malware detection rules on the sets of malware samples with the injected new sample. The computer system 102 can test results from the second round of testing with results from the original test to determine whether the new sample belongs in any of the tested malware families. The computer system 102 can add the new sample to a dictionary of samples for the family to which the new sample belongs.

FIG. 3 is shown as testing the new sample in 2 malware families, malware family A and malware family N, the disclosed techniques may also be applied to testing the new sample in any quantity of malware families. The disclosed techniques can be applied to test the new sample in malware families in parallel. Additionally or alternatively, the disclosed techniques can be applied to test the new sample in malware families in series. In other words, if the computer system 102 determines that the malware sample does not belong in malware family A, then the computer system 102 can inject the malware sample into a next malware family (e.g., malware family N) and test the malware family to determine whether the sample belongs in the next malware family. The computer system 102 can iterate through these techniques until the computer system 102 identifies a malware family to which the malware sample belongs.

As described above in reference to FIG. 1A, a malware sample can be injected into a set of samples of at least one malware family (block A, 310). As an illustrative example, malware sample 320 can be injected into a set of malware family A samples 300A and a set of malware family N samples 300N. In some implementations, the malware sample 320 can be a byte sequence from a malware sample. Optionally, the disclosed techniques can be performed with any number of byte sequences from the malware sample 320 and/or with any number of byte sequences from family A and/or family N described herein. The malware family A samples 300A can include 25 malware samples that have been previously identified as being associated with or otherwise part of the malware family A. The malware family N samples 300N can include 9 malware samples that have been previously identified for the malware family N. Injecting the malware sample 320 (represented in FIG. 3 as a sample having an index of $sX) into the malware family A samples 300A and malware family N samples 300N can include adding the malware sample 320 into the corresponding sets of samples. The malware sample 320 can be temporarily added into the sets of samples for purposes of testing the sets with corresponding malware detection rules, as described herein.

Each malware family can be tested with the injected sample (block B, 312). As described herein, malware detection rules associated with a malware family can be executed/ run on the set of samples for the family that now includes the injected sample. For example, malware detection rules that have been generated for the malware family A can be retrieved (e.g., from a data store) and run/executed on the malware family A samples 300A, which includes the malware sample 320. Malware detection rules that have been generated for the malware family N can be retrieved and run/executed on the malware family N samples 300N, which also includes the malware sample 320. The malware families A and N can be tested in order to determine a type and/or quantity of malware sequences that are generated as a result of running the respective malware detection rules on the respective sets of samples including the malware sample 320.

Output from testing the malware family A and N samples 300A and 300N, respectively, can be assessed to determine whether the malware sample 320 belongs to either family. For example, testing the malware family A samples 300A in block B (312) can result in generating malware family A test output 302A. Testing the malware family N samples 300N can result in generating malware family N test output 302N. The output 302A and 302N can be assessed to determine whether either satisfy one or more malware family criteria. If the output 302A or 302N satisfies the one or more criteria, then the malware sample 320 can be identified as belonging to the malware family that satisfies the one or more criteria.

Malware family A can be identified as satisfying the one or more malware family criteria based on generating a threshold quantity of sequences during the test (block C, 314). As an illustrative example, the output 302A indicates that an original sequence count for the malware family A is 101 and a post-injection sequence count for the malware family A is 107. On the other hand, the output 302N indicates that an original sequence count for the malware family N is 55 and a post-injection sequence count for the malware family N is 32. The output 302A may satisfy the one or more malware family criteria because the post-injection sequence count is greater than the original sequence count and/or the post-injection sequence count exceeds some predetermined threshold sequence count.

The output 302A indicates that injecting the malware sample 320 into the malware family A samples 300A is beneficial in that the injection increases fidelity of the malware family A samples 300A. As a result of the injection, the malware family A samples 300A can be used to generate more accurate malware detection rules for detecting malicious network traffic that is part of the malware family A.

On the other hand, the output 302N indicates that injecting the malware sample 320 into the malware family N samples 300N is less beneficial in that the injection likely decreases fidelity of the malware family N samples 300N. As a result of the injection, the malware family N samples 300N may cause generation of less accurate malware detection rules for detecting malicious network traffic that is part of the malware family N.

Therefore, as described herein, it can be determined that the malware sample 320 likely belongs to the malware family A, rather than the malware family N. In some implementations, it can be determined that the malware sample 320 does not belong to either of the malware families A or N (e.g., neither of the outputs 302A and 302N satisfy the one or more malware family criteria). The malware sample 320 can be injected into sets of samples for one or more other malware families to determine whether the malware sample 320 belongs to any of those families.

Referring back to the illustrative example of FIG. 3, once it is determined that the malware sample 320 belongs to the malware family A, the injected malware sample 320 can be added to a dictionary for the malware family A and removed from the set of samples 300N associated with the malware family N (block D, 316). Since the malware sample 320 is added to the malware family A, the malware family A samples 300A can be updated to malware family A samples 300A', which includes the malware sample 320 as a 26$^{th}$ sample that is now associated with the malware family A. In one or more future implementations another malware sample can be injected into the malware family A samples 300A' to determine whether the another malware sample belongs in the malware family A.

Since the malware sample 320 does not belong in the malware family N, the malware family N samples 300N can be updated to malware family N samples 300N', in which the malware sample 320 is removed. The malware family N samples 300N' therefore includes only the malware samples that have been identified for the malware family N, which includes the 9 samples that were part of the malware family N before the malware sample 320 was injected in block A (310). As described above regarding the malware family A samples 300A', the malware family N samples 300N' can be used in subsequent testing to determine whether other malware samples belong to the malware family N.

Blocks A-D (310-316) can be performed by the computer system 102, as described herein. In some implementations, blocks A-D (310-316) can be performed by one or more other computing systems and/or computing devices.

Figure 4B:
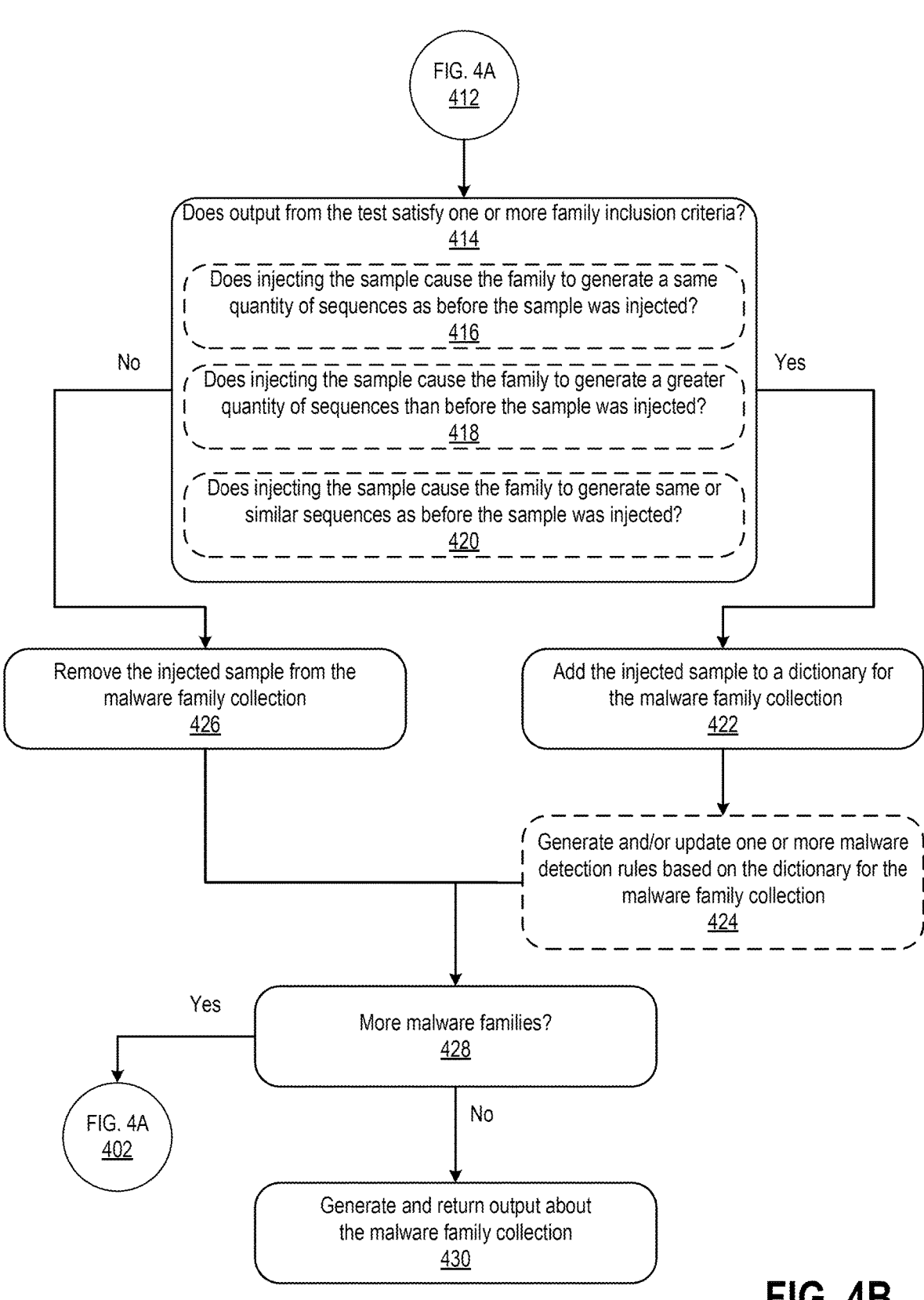

FIGS. 4A-B is a flowchart of a process 400 for determining whether a malware sample belongs to a particular malware family. The process 400 can be performed to determine that correct samples belong in a collection of samples for a particular malware family. As a result, the collection of samples for the particular malware family can be used to generate malware detection rules that are accurate in identifying and deterring malware of that family type in network traffic. Therefore, the disclosed techniques can be used to discover different versioning of the particular malware family and address the different versions with one set of malware detection rules and/or using one streamlined process for generating the malware detection rules. If the collection includes malware samples that may not belong to the particular malware family, then the computer system may generate malware detection rules that do not identify variations of the particular malware family that may attempt to infiltrate an enterprise's internal network in network traffic. As a result, variations of the malware family may infiltrate the enterprise's internal network, thereby creating a security threat to the enterprise.

The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system.

Referring to the process 400 in both FIGS. 4A-B, the computer system can receive a collection of malware signature samples for a malware family in block 402. The collection can include all signature samples that are known or otherwise have been previously identified for the particular malware family. The collection can include a subset of all the signature samples that are known or previously identified for the particular malware family, in some implementations. Refer to block A (120) in FIG. 1A for further discussion.

In some implementations, the computer system can perform one or more dataset-cleansing techniques to the collection of malware signature samples for the particular malware family. The disclosed techniques can be highly sensitive to a level of quality of a dataset, such as the collection of samples for the particular family. Therefore, if the same sample(s) is included in 2 different malware family collections, the disclosed techniques may not accurately test the family collections for purposes of identifying samples unique to each family that are then used to generate malware family detection rules. Similarly, the disclosed techniques may not be accurate if 2 unrelated samples appear in the same malware family collection and/or more than one family uses a same obfuscator.

In block 404, the computer system can receive a unique malware sample. In some implementations, the computer system can optionally retrieve the sample from a dictionary of baseline samples in block 406. In some implementations, the computer system can optionally generate the sample in block 408. In blocks 404-408 the computer system can optionally receive from another system the unique malware sample. Refer to block B (122) in FIG. 1A for further discussion.

In some implementations, the computer system may generate the unique malware sample in block 408 using random generation techniques and/or dataset-cleansing techniques. For example, the computer system may receive a dictionary of baseline files. The baseline files may or may not be associated with one or more malware families. The computer system can cleanse the dictionary by removing conflicting samples or files, implementing standard capitalization and/or convert data types amongst the samples or files, and/or handle any missing values or other formatting errors amongst the samples or files. Once the dictionary of baseline files is cleansed, the computer system can select one of the samples therein to be used as the unique malware sample in the process 400. The computer system can select a first sample in the dictionary. The computer system can randomly select a sample in the dictionary. In some implementations, the computer system can combine one or more of the samples in the dictionary to generate the unique malware sample. The computer system can apply one or more other rules and/or criteria to generate the unique malware sample from the dictionary of baseline files.

In block 410, the computer system can inject the unique malware sample into the malware family collection. In some implementations, the computer system can select a subset of samples from the malware family collection, then inject the unique malware sample therein. As a result, the computer system can test an effect of adding the unique malware sample in smaller batches to more accurately determine whether the sample is in fact part of the particular malware family. This technique can also be beneficial to determine whether the subset of samples (including the unique malware sample) is a particular versioning of the malware family.

The computer system can test (e.g., simulate) sequence generation of the malware family collection having the injected sample (block 412). As a result, the computer system can determine an effect on detection rules associated with the particular malware family that results from adding the unique malware sample to the malware family collection. The computer system can test the collection of malware samples by running one or more pre-existing or previously generated malware detection rules associated with the particular malware family on the collection. In some implementations, the computer system can run one or more rules that have been generated for purposes of testing the collection of malware samples.

Running the rules on the collection of malware samples that includes the injected sample can cause generation of one or more malware signature sequences. The generated signature sequences can be assessed by the computer system and compared to signature sequences that have been previously generated by testing the collection of malware samples without the injected sample. The generated signature sequences can also be compared to signature sequences that are generated by testing collections of malware samples associated with other malware families to determine which family the injected sample likely belongs to.

The computer system can determine whether output from the test satisfies one or more family inclusion criteria (block 414). For example, the computer system can optionally determine whether injecting the sample causes the family to generate a same quantity of sequences as before the sample was injected into the malware family collection (block 416). Additionally or alternatively, the computer system can optionally determine whether injecting the sample causes the family to generate a greater quantity of sequences than before the sample was injected into the collection (block 418). Additionally or alternatively, the computer system can optionally determine whether injecting the sample causes the family to generate same or similar sequences as before the sample was injected into the collection (block 420). The computer system can implement statistical analyses to determine whether the test output satisfies the one or more family inclusion criteria.

As an illustrative example of blocks 410-420, the computer system can run the one or more rules on a subset of the malware family collection that includes 2 malware samples known for that family. The computer system can determine a count and/or type of malware signature sequences that are generated as a result of running the rules on the subset containing the 2 malware samples. The count can be a baseline count or original count for the particular malware family. The computer system can then inject the unique malware sample into the subset so that the subset now includes the 2 malware samples and the unique malware sample. The computer system can run the same rules on this updated subset to determine an updated count and/or updated type of malware signature sequences that are generated as a result of running the rules on the updated subset. The updated count and/or updated type of signature sequences can be compared to the original count and/or original type of signature sequences to determine whether the one or more family inclusion criteria is satisfied.

For example, the one or more criteria can be satisfied if the updated count and/or updated type is the same as or within some threshold range of the original count and/or original type for the malware family. The one or more criteria can be satisfied if the updated count is greater than or exceeds the original count by at least a threshold amount. As another example, the one or more criteria can be satisfied if the updated count is greater than some threshold count value.

Sometimes, the computer system can determine that although the one or more criteria is satisfied, the unique malware sample is a different version of the particular malware family (e.g., a different version compared to a version of the samples in the subset, a different version than any known versions for the particular malware family). For example, the unique malware sample may be a different version of the malware family if the updated count exceeds the original count by at least the threshold amount. As another example, the unique malware sample can be a different version if the updated type of signature sequences includes one or more variations in the type of signature sequences. On the other hand, if the updated count is the same as or within some threshold range of the original count, the computer system can determine that the unique malware sample is a same version as the other malware samples in the subset. Similarly, if the updated type of signature sequences is the same as the original type of signature sequences, the computer system can determine that the unique malware sample is a same version as the other malware samples.

In some implementations, the computer system can identify whether a sample is a different version or of a particular version of a malware family based on maintaining a set of files where the version is known for each file. Then, the computer system can inject the unknown file into that set, perform the techniques described herein, and match the results of the unknown file from performing the disclosed techniques with one that is known. As a result, the computer system can determine whether the unknown file is of the same version as the matched file. If the computer system determines that there are not a match between the unknown file and another file in the known set of files, then the file is likely a new version that hasn't been identified yet by the computer system.

In some implementations, if the computer system determines that the unique malware sample is a different version of the particular malware family, the computer system can assign, to the unique malware sample, a unique identifier, label, or other data/metadata that indicates the version of the unique malware sample. Even though the unique malware sample may be a different version than other malware samples in the malware family, the computer system can generate and/or update one or more malware detection rules for the malware family that address all different versions of the malware family.

As another example, the one or more criteria may not be satisfied if the updated count and/or updated type are not within some threshold range of the original count and/or original type. The one or more criteria may not be satisfied if the updated count is less than the original count by at least a threshold amount. The one or more criteria may not be satisfied if the updated count is less than some threshold count value. One or more other examples of the criteria and/or satisfying the criteria are also possible.

As an illustrative example, the computer system can inject a first unique malware sample into the subset that includes 2 malware samples. Once the rules are run against this subset, a first resulting count of signature sequences can be returned, which can be identified as the same as the original count. Therefore, the computer system can determine that the one or more criteria is satisfied and the first unique malware sample is part of the particular malware family. The computer system can then inject a second unique malware sample into the subset so that the subset includes the original 2 malware samples, the first unique malware sample, and the second unique malware sample. Once the rules are run against this subset, a second resulting count can be returned. The computer system can identify that the second resulting count is $\frac{1}{10}^{th}$ of the original count and/or the first resulting count. Thus, the one or more criteria may not be satisfied and the computer system can determine that the second unique malware sample is likely not part of the particular malware family. After all, including the second unique malware sample in the particular malware family causes the malware detection rules to detect fewer malware sequences and thus have lower fidelity. The second unique malware sample can be removed from the subset and injected into subsets of other malware families to determine which malware family the second unique malware sample belongs to.

Referring to blocks 414-420, if the computer system determines that the output does not satisfy the one or more family inclusion criteria, the computer system proceeds to block 426, in which the computer system removes the injected sample from the malware family collection. The computer system then proceeds to block 428, described below.

Referring back to blocks 414-420, if the computer system determines that the output satisfies the one or more family inclusion criteria, then the computer system proceeds to block 422. In block 422, the computer system adds the injected sample into a dictionary for the malware family collection. Adding the unique malware sample into the dictionary can include tagging the sample as being associated with the particular malware family. As another example, adding the sample to the dictionary can include generating a label, identifier, or other data/metadata for the sample that indicates that the sample is part of the particular malware family.

The computer system may optionally generate and/or update one or more malware detection rules based on the dictionary for the malware family, which now includes the injected sample (block 424). Refer to block G (132) in FIG. 1A and block H (154) in FIG. 1B for further discussion.

The computer system then proceeds to block 428. In block 428, the computer system determines whether there are more malware families to assess. If there are more families to assess, the computer system returns to block 402 and repeats the process 400 for each remaining family. In some implementations, the computer system may repeat the process 400 until the computer system identifies which malware family the unique malware sample belongs to. In some implementations, the computer system can repeat the process 400 until the computer system identifies each malware family that each unique malware sample belongs to.

If there are no more malware families to assess in block 428, then the computer system proceeds to block 430. For example, the computer system may determine that there are no more malware families to assess if the computer system determines that the unique malware sample belongs to the particular malware family collection that was tested in block 412.

In block 430, the computer system generates and returns output about the malware family collection. The output can include the dictionary, which may include the malware sample if the sample is identified as being associated with the malware family collection. The output can include one or more malware detection rules that are associated with the malware family collection. The output can include counts of sequences that are generated as a result of testing the malware family collection before and after the unique malware sample is injected. One or more other outputs are also possible, as described herein. Refer to block H (134) in FIG. 1A and block I (156) in FIG. 1B for further discussion.

In some implementations, the process 400 can be performed with one or more variations. For example, instead of injecting the unique malware sample into a set of malware samples for the particular malware family, the computer system can perform the disclosed techniques to test (e.g., simulate) sequence generation of all the samples associated with the particular malware family. If the one or more family inclusion criteria is not satisfied, the computer system can remove a threshold quantity of samples from the set (e.g., one sample at a time) and then test this updated set of samples. The computer system can continue to remove the threshold quantity of samples from the set and test the set until the computer system determines that the one or more family inclusion criteria is satisfied. The resulting set of samples can indicate a full/complete set of samples that are associated with the particular malware family. This resulting set of samples can then be used to generate and/or update the malware detection rules for the particular malware family.

FIG. 5 is a flowchart of a process 500 for determining whether a malware sample belongs to a sub-family of a particular malware family. Identifying and determining whether malware samples belong to sub-families can increase fidelity of the overall malware family since the family can more accurately identify different variations and/or versions of the particular malware family.

The process 500 can be performed by the computer system 102. The process 500 can also be performed by one or more other computing systems, devices, computers, networks, cloud-based systems, and/or cloud-based services. For illustrative purposes, the process 500 is described from the perspective of a computer system.

Referring to the process 500 in FIG. 5, the computer system can receive a collection of malware signature samples for a malware family in block 502. Refer to block A (120) in FIG. 1A and block 402 in the process 400 of FIGS. 4A-B for further discussion.

Optionally, the computer system can generate a plurality of sub-families in the collection in block 504. Each of the plurality of sub-families can represent a different version of the particular malware family. The computer system can identify samples in the malware family collection that have similar characteristics, traits, or versioning information. The computer system can group together samples having similar or same obfuscators. The computer system can group together samples having similar or same hexadecimal sequences or other byte sequences. The computer system can also group together samples that satisfy one or more other sub-family grouping criteria.

In some implementations, the samples in the malware family collection can already be grouped into sub-families. For example, the samples can be grouped into sub-families in one or more other processes that are performed by the computer system or another computing system, such as the malware rule system 250 described herein. Therefore, the computing system can retrieve the sub-families from a data store or other computing system instead of performing block 504 in the process 500.

The computer system can select a sub-family amongst the plurality of sub-families in the collection (block 506). The computer system can randomly select the sub-family. The computer system can use one or more criteria for selecting the sub-family. For example, the computer system can select a sub-family amongst the plurality of sub-families that was last updated or otherwise assessed using the disclosed techniques. As another example, the computer system can select a sub-family amongst the plurality of sub-families that includes samples sharing at least one similarity with a unique malware sample to be tested in the process 500 (e.g., the similarity being a hexadecimal or other byte sequence, an obfuscator, a naming convention, a file type, etc.).

In block 508, the computer system can inject a unique sample into the selected sub-family. Refer to bock C (124) in FIG. 1A and block 410 in the process 400 of FIGS. 4A-B for further discussion about injecting the unique malware sample into the selected sub-family.

The computer system can test (e.g., simulate) sequence generation of the selected sub-family in block 510. Refer to block D (126) in FIG. 1A and block 412 in the process 400 of FIGS. 4A-B for further discussion about testing the selected sub-family that includes the injected unique malware sample.

The computer system can determine whether the test of sequence generation of the selected sub-family satisfies one or more sub-family criteria in block 512. The one or more sub-family criteria can be similar to the one or more criteria described in reference to FIGS. 1A and 4A-B for testing sequence generation of a malware family. Refer to block E (128) in FIG. 1A and blocks 414-420 in the process 400 of FIGS. 4A-B for further discussion.

If the one or more criteria is satisfied in block 512, the computer system can add the sample to a dictionary for the selected sub-family in block 514. In some implementations, the computer system can add the sample to a dictionary for the malware family that includes the selected sub-family. As a result, the dictionary can include all samples that have been identified for all sub-families of the malware family. Then, this dictionary can be used to streamline and efficiently generate and/or update malware detection rules for the entire malware family. When adding the sample to the dictionary, the computer system can tag, label, and/or annotate the sample as being associated with the selected sub-family.

If the one or more criteria is not satisfied in block 512, the computer system can remove the sample from the selected sub-family in block 516. After all, the computer system can determine that the sample does not belong to the selected sub-family. The sample may, however, belong to another sub-family amongst the plurality of sub-families for the particular malware family.

Accordingly, the computer system may select a next sub-family amongst the plurality of sub-families in block 518. As mentioned above, the computer system can randomly select the next sub-family. The computer system can also select the next sub-family using one or more selection criteria and/or selection rules. Once the next sub-family is selected, the computer system can return to block 508 and repeat blocks 508-516 for the remaining sub-families in the malware family. As a result, the computer system can identify which particular sub-family the unique malware sample belongs to. Determining sub-family classification of the unique malware sample can advantageously provide for increased fidelity of resulting malware detection rules in identifying and stopped malicious network traffic that has traits of any one of the sub-families of the malware family.

Figure 6B:
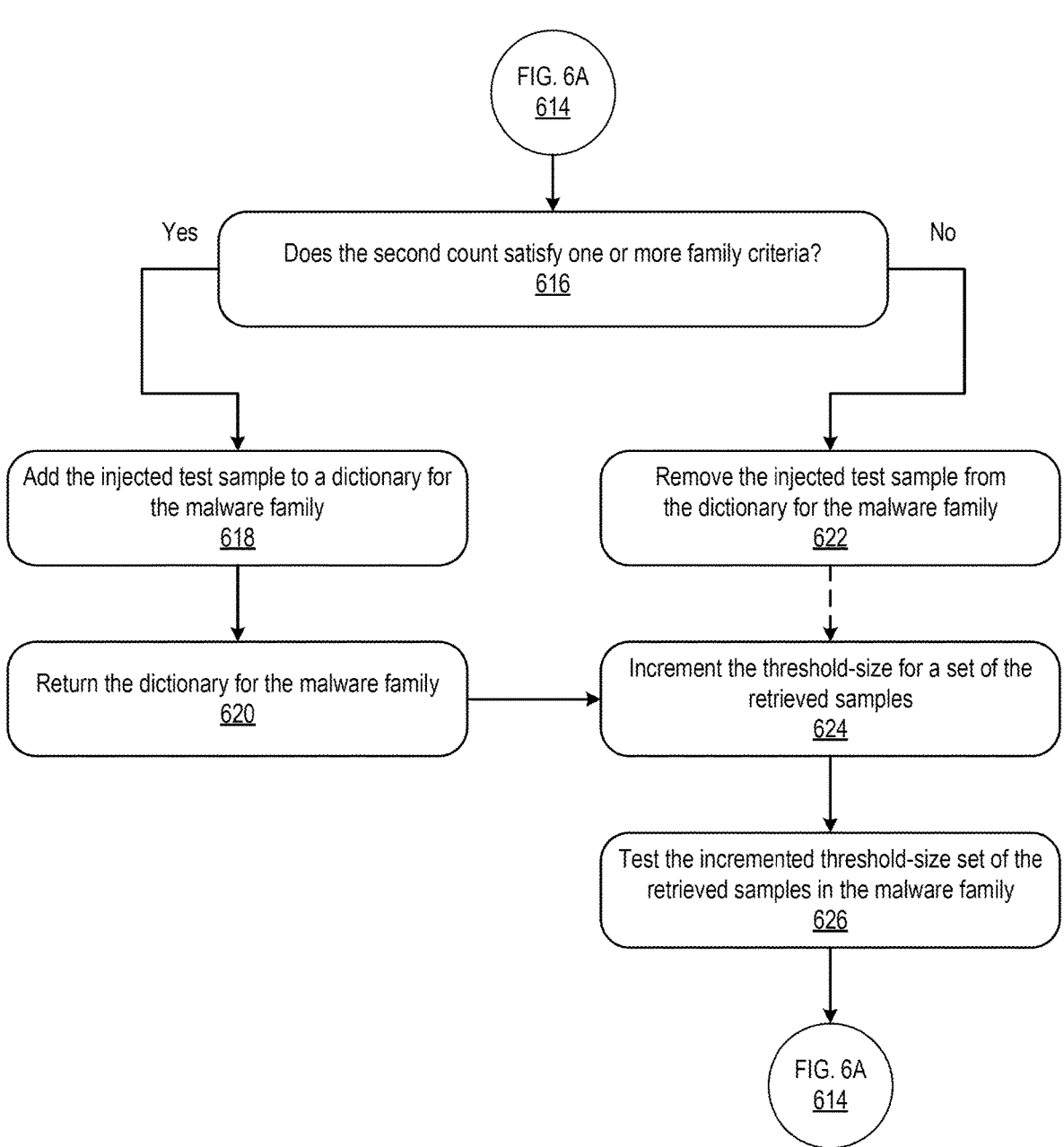

FIGS. 6A-B is a flowchart of another process 600 for determining whether a malware sample belongs to a particular malware family. The process 600 can be performed in scenarios in which the particular malware family produces at least one malware detection rule that does not perform as expected (e.g., the rule(s) does not detect at least a threshold quantity or type of malware signature sequences for the particular malware family). Sometimes, a relevant user, such as an analyst, may not be able to determine or detect why the malware family produced a rule that does not perform as expected. Thus, the process 600 can be performed with a predetermined-size set of samples in which another sample it iteratively added to the set and then tested to determine what sequences are generated as a result. By adding a single sample at a time to the set, the computer system can more accurately identify which sample may be causing the rule that performs poorly to be generated (such as by assessing a quantity of sequences that are generated after testing the set with the added sample). Once the computer system identifies which sample caused the rule to be generated that does not execute as expected, that sample can be removed from the set of samples for the particular malware family. The resulting set of samples can then be used to update and/or generate one or more malware detection rules for the particular malware family.

The process 600 can be performed by the computer system 102. The process 600 can also be performed by one or more other computing systems, devices, computers, networks, cloud-based systems, and/or cloud-based services. For illustrative purposes, the process 600 is described from the perspective of a computer system.

Referring to the process 600 in both FIGS. 6A-B, the computer system can receive an indication that a malware family produced a detection rule that does not satisfy one or more rule quality criteria (block 602). The indication can be generated by and/or received from the user device 104 of a relevant user (e.g., the user can provide user input at their device requesting to check or otherwise update a particular malware family), the computer system itself, and/or the malware rule system 250. The rule quality criteria may not be satisfied if an effectiveness rate of the detection rule is less than a threshold effectiveness level and/or a less than a previous/prior effectiveness rate of the detection rule. The rule quality criteria may not be satisfied if the detection rule fired/executed less than a threshold amount of times over a predetermined period of time. The rule quality criteria may not be satisfied if the detection rule returns more than a threshold quantity of false positives and/or false negatives. One or more other criteria can also be used to assess the quality of the detection rule for purposes of performing the process 600.

The indication that is received in block 602 can include, for example, the effectiveness rate of the detection rule in stopping potentially malicious network traffic in an enterprise's internal network over some predetermined period of time (e.g., a past hour, a past 8 hours, a past day, a past 2 days, a past week, etc.). The indication can indicate that a particular detection rule or multiple detection rules have not been firing/executing as expected over the predetermined period of time. The indication can indicate that a particular detection rule or multiple detection rules are returning more false positives or more false negatives than an expected or threshold level of false positives/negatives or compared to a quantity of returned false positives/negatives during past or prior rule(s) execution.

In some implementations, block 602 may not be performed. Instead, for example, the computer system can perform routine checks or other checks at predetermined time intervals of one or more malware detection rules for one or more malware families. As a result, the process 600 can be automatically performed without an indication first being generated and received in block 602.

The computer system can retrieve malware samples associated with the malware family in block 604. For example, the computer system can retrieve all of the malware samples associated with the malware family that produced the detection rule that does not satisfy the one or more rule quality criteria. The computer system can retrieve a portion of the malware samples associated with the malware family. The computer system can retrieve a random portion of the malware samples. As another example, the computer system can retrieve a subset of the malware samples associated with the malware family. The subset can include malware samples that share similar characteristics, traits, types, or other data/information with the malware detection rule that did not satisfy the one or more rule quality criteria. The subset can include malware samples that were used to generate the malware detection rule, in some implementations.

Optionally, the computer system can test (e.g., simulate sequence generation) a threshold-size set of the retrieved samples in the malware family in block 606. For example, the computer system can start with a smallest quantity of samples in the set to test sequence generation of the set. The smallest quantity of samples in the set can be 1 sample, as an illustrative example. As another example, the threshold-size set of the retrieved samples can include 2 samples. One or more other threshold-size sets can also be determined and/or used in block 606. As a result, the computer system can accurately and efficiently identify a particular malware sample that caused or most likely resulted in the detection rule not satisfying the one or more rule quality criteria. Refer to block 412 in the process 400 of FIGS. 4A-B for further discussion about testing the threshold-size set of the retrieved samples in block 606.

Optionally, the computer system can determine an initial count of sequences that are generated based on testing the set of samples (block 608). As part of block 606, the computer system can test sequence generation of the threshold-size set of samples. As an illustrative example, if the set of samples includes 1 malware sample, the computer system can test in block 606 how many malware sequences the 1 malware sample generates when run with malware detection rules. In block 608, the computer system can generate or otherwise determine the initial count of sequences as the quantity of sequences that are generated during the testing of block 606. The initial count of sequences can represent a baseline quantity of sequences that are generated for the malware family. The initial count can then be used and compared to subsequent counts that are generated when samples are added to the set of samples and then tested to determine whether any of the added samples are cause for the malware detection rule that does not satisfy the one or more rule quality criteria.

In some implementations, blocks 606-608 may not be performed as part of the process 600. Sometimes, the initial count (e.g., the baseline) may already be determined (e.g., by the computer system, by the malware rule system 250, by a relevant user at the user device 104). The computer system may simply retrieve the initial count (e.g., from a data store) and use the initial count when determining whether subsequent sets of samples include a sample that causes the detection rule that does not satisfy the one or more rule quality criteria.

The computer system injects a test sample into the set of samples in block 610. The test sample can be a new malware sample that is retrieved from a dictionary of malware samples described herein (e.g., a dictionary of malware samples associated with the particular malware family of block 602, a dictionary of malware samples associated with various different malware families, a dictionary of malware samples associated with a sub-family of the particular malware family of block 602). For example, the computer system can inject a malware sample that was retrieved in block 604 but that was not included in the threshold-size set of the retrieved samples that was tested in block 606. By injecting the malware sample back into the set for the particular malware family, the computer system can determine whether the injected sample is the sample that was wrongfully associated with the malware family and thus caused the generation and poor performance of the malware detection rule that does not satisfy the one or more rule quality criteria.

In block 612, the computer system tests the set of samples with the injected test sample. Refer to block 412 in the process 400 of FIGS. 4A-B for further discussion.

The computer system can determine a second count of sequences that are generated based on testing the set of samples with the injected test sample (block 614). In other words, the computer system can determine how many signature sequences are generated as a result of the samples in the set (which, as an illustrative example, can include the 1 sample from the threshold-size set that was tested in block 606 and the test sample that was injected in block 610).

The computer system can determine whether the second count satisfies one or more family criteria in block 616. The computer system can compare to the initial count representing the baseline to the second count in block 616. The computer system can determine, for example, whether the second count is the same as or similar to the initial counts. If the counts are the same or similar, the computer system can determine that the injected test sample likely belongs to the malware family and thus is not the cause of the malware detection rule that does not satisfy the rule quality criteria. If the second count is within a threshold range of the initial count, then the computer system can determine that the injected test sample likely belongs to the malware family. If the second count is less than a threshold value or less than the initial count by more than a threshold range, the computer system can determine that the injected test sample likely does not belong to the malware family and thus is a cause of the malware detection rule that does not satisfy the rule quality criteria. On the other hand, if the second count is greater than a threshold value or greater than the initial count by more than a threshold range, then the computer system may determine that the injected test sample likely belongs to the malware family.

If the one or more family criteria is satisfied, the computer system can add the injected test sample to a dictionary for the malware family in block 618. Sometimes, the test sample may already be part of the dictionary for the malware family. As a result, the computer system can keep the test sample in the dictionary in block 618.

The computer system can return the dictionary for the malware family in block 620. The computer system and/or the malware rule system 250 described herein can use the dictionary to generate or update one or more malware detection rules. For example, the updated dictionary can be used to modify the malware detection rule that did not satisfy the rule quality criteria. The updated dictionary can also be used to generate one or more new malware detection rules based at least in part on the test sample that was injected into the set of samples that was tested in block 612.

The computer system can proceed to block 624 before or after returning the dictionary in block 620. Block 624 is described further below.

Referring back to block 616, if the second count does not satisfy the one or more family criteria, then the computer system can remove the injected test sample from the dictionary for the malware family in block 622. After all, the test sample can be the cause for the malware detection rule that does not satisfy the one or more rule quality criteria. The computer system can then optionally proceed to block 624.

Additionally or alternatively, the computer system can increment the threshold-size for a set of the retrieved samples in block 624. By incrementing the size of the set of samples that are being tested, the computer system can determine whether any samples added to the set cause the one or more family criteria in block 616 to not be satisfied.

In block 624, the computer system can increment the threshold-size by 1 sample. The threshold-size can be implemented by any one or more other amounts, such as 2 samples, 3 samples, 4 samples, 5 samples, etc., so long as the threshold size is 1 less than a total size of the malware family. As an illustrative example, the computer system can iterate through the process 600 every time that the computer system increments the threshold-size for the set of the retrieved samples by 1 sample. The malware family can have 50 samples. As a result, the computer system can iterate through the process 49 times, which is 1 less than the total quantity of samples of the malware family.

As the computer system increments the threshold-size in block 624, the computer system can test the incremented threshold-size set of the retrieved samples in the malware family (block 626). In other words, the computer system can test sequence generation of the set of samples that includes at least one additional sample. The computer system can return to block 614 in the process 600 and repeat blocks 614-626 until (i) the computer system determines that one of the samples that is added to the set of samples causes a count of generated sequences to not satisfy the one or more family criteria and/or (ii) the computer system can no longer increment the threshold-size for the set of retrieved samples (e.g., the computer system has increased the threshold-size to the total size of the malware family less 1 sample).

Figure 7:
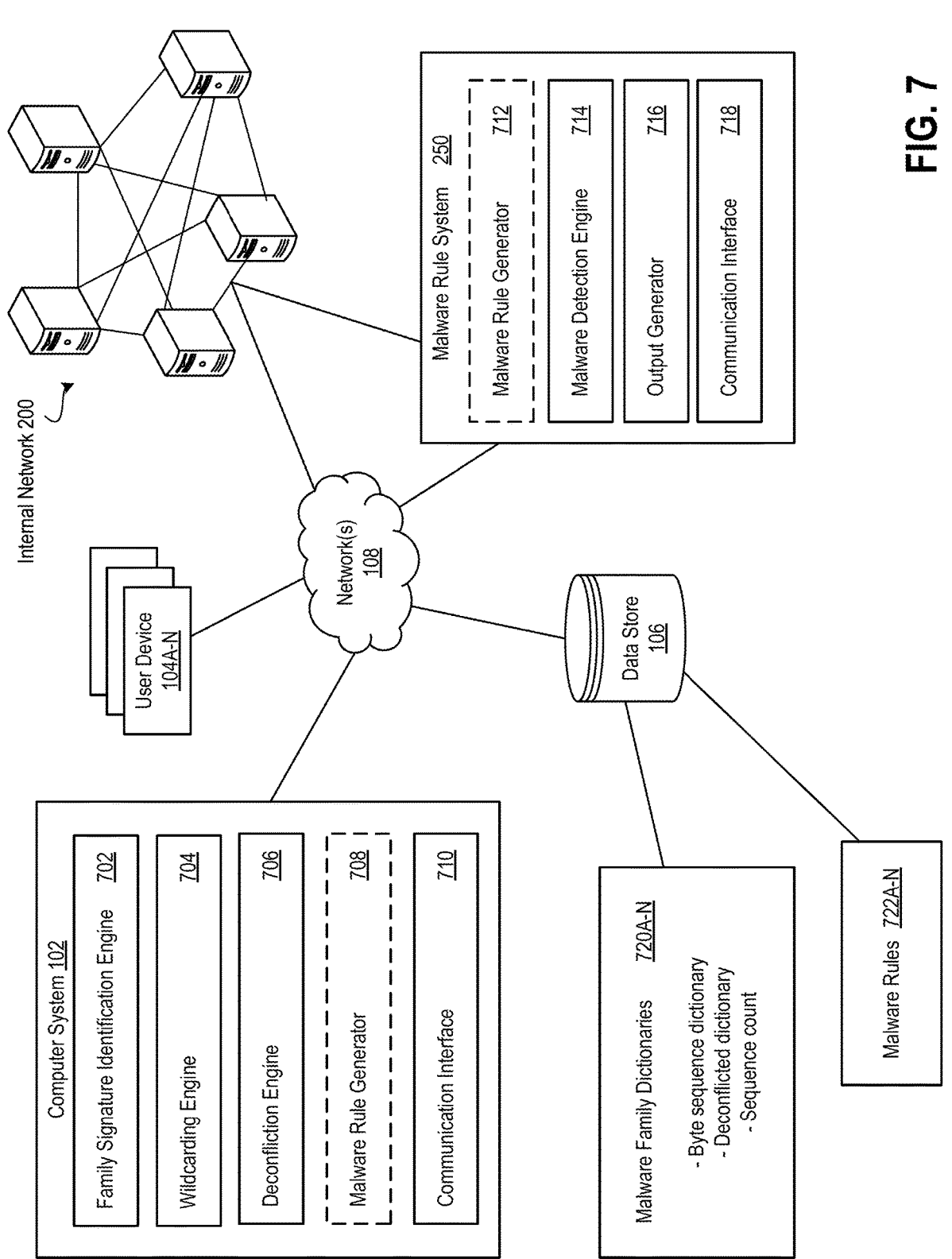
FIG. 7 is a system diagram of components that can be used to perform the techniques described herein.

FIG. 7 is a system diagram of components that can be used to perform the techniques described herein. The computer system 102, user devices 104A-N, data store 106, internal network 200, and malware rule system 250 can communicate (e.g., wired and/or wirelessly) via the network(s) 108.

The computer system 102 can include a family signature identification engine 702, a wildcarding engine 704, a deconfliction engine 706, an optional malware rule generator 708, and a communication interface 710.

The family signature identification engine 702 can perform techniques such as identifying byte sequences that are unique to a particular malware family, as described in reference to FIGS. 1B and 2A-B. When the engine 702 identifies sequences for the particular malware family, the engine 702 can update a corresponding malware family dictionary 720A-N in the data store 106 with the identified sequences. The dictionary can, for example, be a byte sequence dictionary, as shown in FIG. 7. The engine 702 can also update a sequence count in the corresponding malware family dictionary 720A-N. As described herein, the sequence count can indicate a quantity of instances of the particular identified sequence, a quantity of malware signature samples in the particular malware family having the particular identified sequence, and/or a quantity of instances that the particular identified sequence appears in any given malware signature sample in the malware family.

The wildcarding engine 704 can be configured to inject wildcard bytes into one or more sequences in each of the malware family dictionaries 720A-N as part of identifying malware sequences that are unique to a particular malware family. The engine 704 can add the sequences with the injected wildcard bytes as new sequences in the respective malware family dictionary 720A-N, thereby expanding the respective dictionary with variation in signature sequences for the particular malware family.

The deconfliction engine 706 can be configured to reduce the size of a dictionary 720A-N to include only sequences that are identified for the particular malware family. For example, the deconfliction engine 706 can perform the techniques described in FIGS. 1A, 3, and 4-6. As another example of a deconfliction process, the engine 706 can retrieve a dictionary 720A for a particular malware family and compare sequences in that dictionary 720A to sequences in other dictionaries 720B-N that correspond to other malware families. If the engine 706 identifies conflicting sequences, the engine 706 removes the conflicting sequences from the dictionary 720A for the particular malware family. In some implementations, instead of removing the conflicting sequences from the dictionary 720A, the engine 706 can generate a new dictionary, such as the deconflicted dictionary shown in FIG. 7, which includes all sequences for the particular malware family that did not have conflictings in other malware families. The engine 706 may also update the sequence count for the dictionary 720A based on removing one or more conflicting sequences from the dictionary 720A.

The optional malware rule generator 708 can be configured to update and/or generate one or more malware detection rules 722A-N. The generator 708 can receive any of the dictionaries 720A-N described herein from the data store 106. Using the received dictionary, the generator 708 can update and/or generate rules for detecting and responding to a malware family that is associated with the received dictionary. The updated and/or generated rules 722A-N can then be stored in the data store 106, transmitted to one or more of the user devices 104A-N for presentation to relevant users of the internal network 200 of the enterprise, and/or transmitted to the malware rule system 250 for runtime execution.

The communication interface 710 can be configured to provide communication between the computer system 102 and one or more of the components described herein over the network(s) 108.

The user devices 104A-N can be any type of computing device described in reference to FIG. 1A. The user devices 104A-N can be used by relevant users to the enterprise and the internal network 200. For example, the user devices 104A-N can be used by analysts or other users who work in security and management of network traffic for the internal network 200. The user devices 104A-N can include input devices, such as keyboards, microphones, and/or touch screens, for receiving input from the respective user. The user devices 104A-N can include output devices, such as display screens and/or speakers, for presenting information to the respective user. For example, the user devices 104A-N can present one or more of the dictionaries 720A-N and/or the rules 722A-N in a graphical user interface (GUI) display. The GUI display can be presented in a mobile application, webpage, or other type of software. The respective user can provide user input for updating one or more of the rules 722A-N based on the dictionaries 720A-N and/or other information determined by the components of the computer system 102 in the techniques described herein. The user can also view, review, and/or modify one or more of the rules 722A-N that have been updated and/or generated by the computer system 102 and/or the malware rule system 250 using the disclosed techniques.

The malware rule system 250 can include an optional malware rule generator 712, a malware detection engine 714, an output generator 176, and a communication interface 718. The malware rule system 250 can be, in some implementations, a security system implemented on the edge of the internal network 200 of the enterprise. The malware rule system 250 can include, in some implementations, a YARA rule generator. The malware rule system 250 can use the rules 722A-N to identify malware instances in network traffic that is transmitted via the network(s) 108 before entering the internal network 200. Any of the rules 722A-N can be loaded and executed by the malware rule system 250 for runtime execution.

The optional malware rule generator 712 can perform similar or same techniques as the malware rule generator 708 described above.

The malware detection engine 714 can operate in runtime. The engine 714 can monitor network traffic from systems and/or devices connected to the network(s) 108. By monitoring the network traffic, the engine 714 can execute any of the rules 722A-N and/or look for malicious files before the malicious files infiltrate the internal network 200. If one or more of the rules 722A-N are triggered by malicious files, the engine 714 can block the malicious files from entering the internal network 200. The engine 714 can also perform one or more other actions, such as generating a report about the blocked malicious files and/or the rules that were triggered or otherwise responding to the malicious files that were blocked. The engine 714 can receive or retrieve the malware rules 722A-N from the data store 106 whenever such rules are updated and/or generated. As a result, the engine 714 can monitor the network traffic in real-time with most up-to-date rules to prevent malicious files from infiltrating the internal network 200.

The output generator 716 can be configured to generate output about runtime execution of the rules 722A-N by the malware detection engine 714. For example, the engine 716 can generate output documenting what rules 722A-N were triggered, how much network traffic and what network traffic was blocked from entering the internal network 200, automated responses by the malware rule system 250 to the network traffic that was blocked and/or the rules that were triggered, and/or timestamps associated with these actions. Other actions may also be documented by the output generator 716. Output made by the generator can then be stored in the data store 106, transmitted to the computer system 102 and used to refine/update one or more of the rules 722A-N, and/or transmitted to the user devices 104A-N for presentation to the relevant user.

The communication interface 718 can provide communication between the malware rule system 250 and other components described in FIG. 7.

Figure 8:
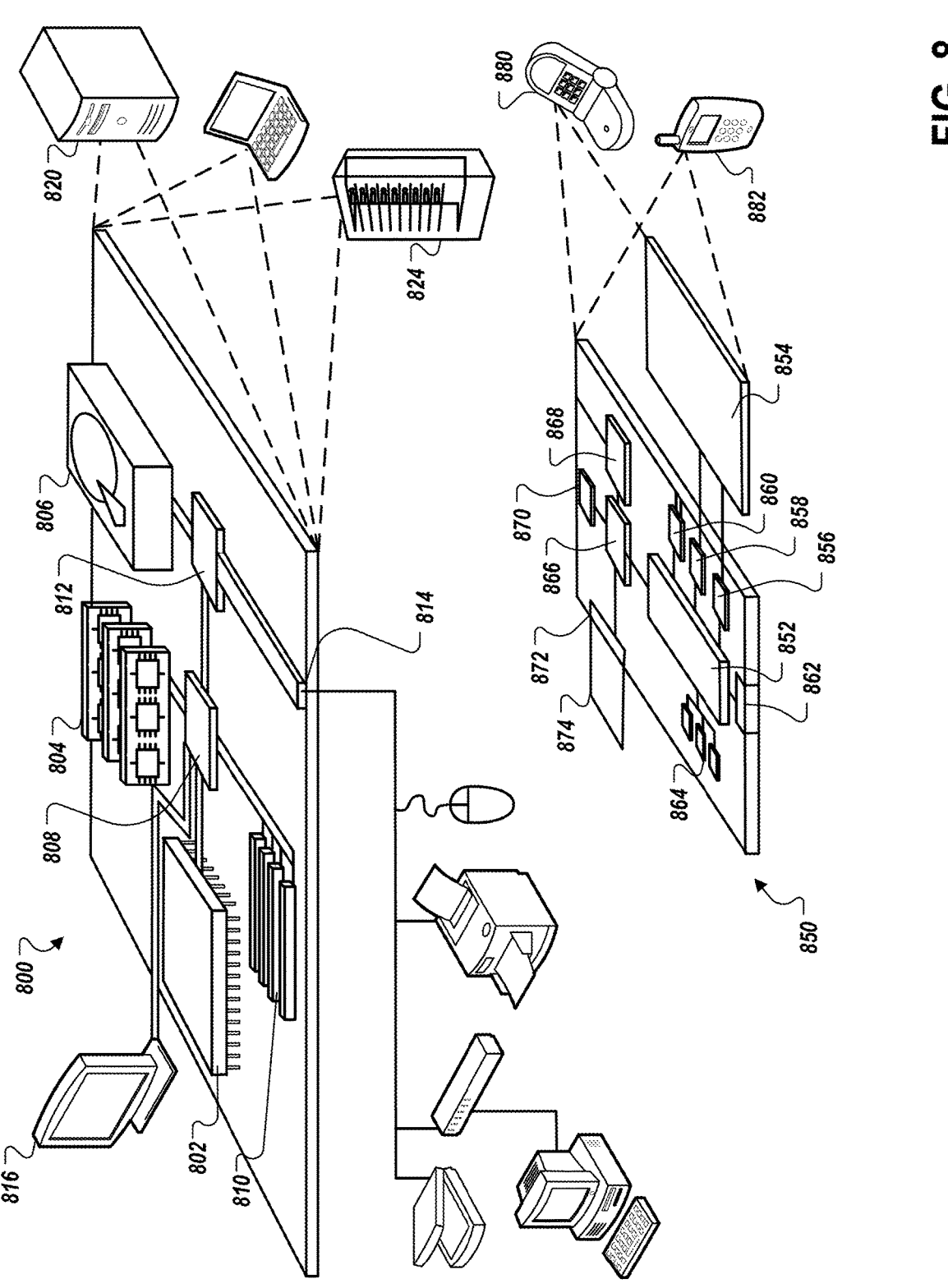
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880.

It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for identifying a malware family to which a malware sample belongs, the method comprising:

receiving, by a computer system, a collection of malware signature samples for a malware family;

identifying, by the computer system, a test malware sample, wherein the test malware sample is used, by the computer system, to test whether the collection of malware signature samples includes a malware sample that causes generation of at least one malware detection rule that does not satisfy one or more rule quality criteria;

injecting, by the computer system, the test malware sample into the collection of malware signature samples;

simulating, by the computer system, sequence generation of the collection of malware signature samples based on an iterative, repeatable procedural process comprising:

applying the at least one malware detection rule to the collection of malware signature samples to cause the collection of malware signature samples to generate a set of malware signature sequences characteristic of the collection of malware signature samples including the injected test malware sample, determining a numerical count indicating a quantity of malware signature sequences within the generated set of malware signature sequences, wherein the numerical count serves as a metric reflecting an impact of the injected test malware sample on the characteristic malware signature sequences of the collection, and determining, by the computer system, whether the numerical count, as the metric, satisfies one or more family inclusion criteria specifically defined by thresholds related to the numerical count, satisfaction of which validates membership of the test malware sample within the malware family;

adding, by the computer system, one or more of the malware signature sequences to a dictionary of malware signature sequences for the malware family based on a determination that the numerical count satisfies the one or more family inclusion criteria; and returning, by the computer system, the dictionary for the malware family to be used for updating or generating the at least one malware detection rule for the malware family.

2. The method of claim 1, wherein identifying, by the computer system, a test malware sample comprises retrieving the test malware sample from the dictionary of malware samples for the malware family.

3. The method of claim 1, wherein injecting, by the computer system, the test malware sample into the collection of malware signature samples comprises:

identifying a subset of malware signature samples amongst the collection of malware signature samples; and injecting the test malware sample into the subset of the collection of malware signature samples, wherein the test malware sample is a malware sample in the collection of malware signature samples that was not included in the subset of the malware signature samples.

4. The method of claim 1, wherein determining, by the computer system, whether the numerical count satisfies one or more family inclusion criteria comprises determining that injecting the test malware sample into the collection causes the count to be within a threshold range of an initial count of malware signature sequences generated by the collection, wherein the initial count was generated, by the computer system, before the test malware sample was injected into the collection.

5. The method of claim 1, wherein determining, by the computer system, whether the numerical count, as the metric, satisfies one or more family inclusion criteria specifically defined by thresholds related to the numerical count, satisfaction of which validates membership of the test malware sample within the malware family comprises determining that injecting the test malware sample into the collection causes the numerical count to be greater than a threshold count.

6. The method of claim 1, wherein determining, by the computer system, whether the numerical count, as the metric, satisfies one or more family inclusion criteria specifically defined by thresholds related to the numerical count, satisfaction of which validates membership of the test malware sample within the malware family comprises determining that injecting the test malware sample into the collection causes a similar or same type of malware signature sequences to be generated as a type of malware signature sequences generated by the collection before the test malware sample was injected into the collection.

7. The method of claim 1, further comprising: removing, by the computer system, the test malware sample from the collection based on a determination that the count does not satisfy the one or more family inclusion criteria.

8. The method of claim 1, further comprising: generating, by the computer system, one or more malware detection rules for the malware family based at least in part on the test malware sample that was added to the dictionary for the malware family.

9. The method of claim 1, wherein returning, by the computer system, the dictionary for the malware family comprises transmitting the dictionary to a malware rule engine that is configured to perform at least one of: (i) updating the at least one malware detection rule, (ii) generating one or more malware detection rules for the malware family based on the dictionary for the malware family, or (iii) identifying malware instances in network traffic using the updated at least one malware detection rule or the generated one or more malware detection rules.

10. The method of claim 1, further comprising:

generating, by the computer system, a sub-family of malware signature samples from the collection of malware signature samples;

injecting, by the computer system, the test malware sample into the sub-family;

simulating, by the computer system, sequence generation of the sub-family that includes the test malware sample;

determining, by the computer system, whether the simulated sequence generation of the sub-family satisfies one or more sub-family inclusion criteria;

annotating, by the computer system, the test malware sample as being a member of the sub-family based on a determination that the one or more sub-family inclusion criteria is satisfied; and adding, by the computer system, the annotated test malware sample to at least one of: the dictionary for the malware family or a dictionary for the sub-family.

11. The method of claim 10, wherein the sub-family includes malware signature samples from the collection that have at least one of a same: versioning, obfuscator, or portion of a byte sequence.

12. The method of claim 1, further comprising:

retrieving, by the computer system, a threshold-size set of malware signature samples for the malware family;

simulating, by the computer system, sequence generation of the threshold-size set of malware signature samples;

generating, by the computer system, a baseline count indicating a quantity of malware signature sequences that are generated during the simulating; and comparing, by the computer system, the numerical count to the baseline count to determine whether the numerical count satisfies the one or more family inclusion criteria.

13. The method of claim 12, wherein the threshold-size set is one malware signature sample for the malware family.

14. The method of claim 12, further comprising:

injecting, by the computer system, the test malware sample into the threshold-size set of malware signature samples for the malware family; and simulating, by the computer system, sequence generation of the threshold-size set of malware signature samples that includes the injected test malware sample.

15. The method of claim 14, further comprising:

injecting, by the computer system, another test malware sample into the threshold-size set of malware signature samples; and simulating, by the computer system, sequence generation of the threshold-size set of malware signature samples that includes (i) the injected test malware sample and (ii) the another test malware sample.

16. The method of claim 15, further comprising: iteratively performing, by the computer system, the injecting and simulating steps until the threshold-size set of malware signature samples includes a total quantity of the malware signature samples for the malware family less one malware signature sample.

17. The method of claim 1, wherein the iterative, repeatable procedural process further comprises:

wildcarding, by the computer system, one or more of the malware signature sequences, by injecting a wildcard sequence into one or more of the malware signature sequences;

adding, by the computer system, the wildcarded malware signature sequences to the dictionary, such that the dictionary comprises both malware signature sequences and wildcarded malware signature sequences;

deconflicting the dictionary to remove conflicting malware signature sequences and wildcarded malware signature sequences from the dictionary; and wherein returning, by the computer system, the dictionary for the malware family to be used for updating or generating the at least one malware detection rule for the malware family comprises returning, by the computer system, the deconflicted dictionary, comprising both malware signature sequences and wildcarded malware signature sequences, for the malware family to be used for updating or generating the at least one malware detection rule for the malware family.

18. A system for identifying a malware family to which a malware sample belongs, the system comprising:

a computer system configured to generate malware detection rules for at least one malware family;

a data store configured to receive and store the malware detection rules generated by the computer system; and a rule engine configured to retrieve the malware detection rules from the data store and detect, using the retrieved malware detection rules, malware instances in network traffic, wherein the computer system comprises processors and memory and is configured to perform operations comprising:

retrieving, from the data store, a collection of malware signature samples for a malware family;

identifying a test malware sample, wherein the test malware sample is used, by the computer system, to test whether the collection of malware signature samples includes a malware sample that causes generation of at least one malware detection rule that does not satisfy one or more rule quality criteria;

injecting the test malware sample into the collection of malware signature samples;

simulating sequence generation of the collection of malware signature samples based on an iterative, repeatable procedural process comprising:

applying the at least one malware detection rule to the collection of malware signature samples to cause the collection of malware signature samples to generate a set of malware signature sequences characteristic of the collection of malware signature samples including the injected test malware sample, determining a numerical count indicating a quantity of malware signature sequences within the generated set of malware signature sequences, wherein the numerical count serves as a metric reflecting an impact of the injected test malware sample on the characteristic malware signature sequences of the collection, and determining whether the numerical count, as the metric, satisfies one or more family inclusion criteria specifically defined by thresholds related to the numerical count, satisfaction of which validates membership of the test malware sample within the malware family;

adding one or more of the malware to a dictionary of malware signature sequences for the malware family based on a determination that the numerical count satisfies the one or more family inclusion criteria; and returning the dictionary for the malware family to be used for updating or generating the at least one malware detection rule for the malware family.

19. The system of claim 18, wherein:

the computer system is configured to perform operations comprising transmitting the deconflicted dictionary for the malware family to the rule engine, and the rule engine is configured to perform operations comprising generating one or more malware detection rules for the malware family based at least in part on the deconflicted dictionary.

20. The system of claim 19, wherein the iterative, repeatable procedural process further comprises:

wildcarding, by the computer system, one or more of the malware signature sequences, by injecting a wildcard sequence into one or more of the malware signature sequences;

adding, by the computer system, the wildcarded malware signature sequences to the dictionary, such that the dictionary comprises both malware signature sequences and wildcarded malware signature sequences; and deconflicting the dictionary to remove conflicting malware signature sequences and wildcarded malware signature sequences from the dictionary; and wherein returning the dictionary for the malware family to be used for updating or generating the at least one malware detection rule for the malware family comprises returning the deconflicted dictionary, comprising both malware signature sequences and wildcarded malware signature sequences, for the malware family to be used for updating or generating the at least one malware detection rule for the malware family.

\* \* \* \* \*